United States Patent
Lee et al.

(10) Patent No.: US 9,530,265 B2
(45) Date of Patent: Dec. 27, 2016

(54) MOBILE TERMINAL AND VEHICLE CONTROL

(71) Applicant: LG ELECTRONICS INC., Seoul (KR)

(72) Inventors: Kiho Lee, Seoul (KR); Chiwon Song, Seoul (KR); Jaehee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/709,731

(22) Filed: May 12, 2015

(65) Prior Publication Data

US 2015/0332532 A1 Nov. 19, 2015

(30) Foreign Application Priority Data

May 14, 2014 (KR) ........................ 10-2014-0057920

(51) Int. Cl.
*G07C 9/00* (2006.01)
*G08C 17/02* (2006.01)

(52) U.S. Cl.
CPC ....... *G07C 9/00563* (2013.01); *G07C 9/00658* (2013.01); *G08C 17/02* (2013.01); *G07C 2009/00968* (2013.01); *G07C 2209/64* (2013.01); *G08C 2201/20* (2013.01); *G08C 2201/32* (2013.01); *G08C 2201/91* (2013.01); *G08C 2201/93* (2013.01)

(58) Field of Classification Search
CPC ................. G07C 9/00309; G07C 2009/00769; G07C 9/00007; G07C 9/00111; G07C 9/00571; G07C 2009/00793; G07C 9/00103

USPC ........................................................ 340/5.72
See application file for complete search history.

(56) References Cited

U.S. PATENT DOCUMENTS 7,783,391 B2 * 8/2010 Jeong ................. A61B 5/04888
600/587

FOREIGN PATENT DOCUMENTS

DE        4226053 A1      2/1993
EP      2 698 686 A2      2/2014
KR    EP 2698686 A2 *     2/2014   ............. G06F 3/014

OTHER PUBLICATIONS

European Search Report dated Sep. 25, 2015 for European Application No. 15001178.1, 5 pages.

(Continued)

*Primary Examiner* — Mark Blouin
(74) *Attorney, Agent, or Firm* — Fish & Richardson P.C.

(57) ABSTRACT

A mobile terminal is configured to be worn on a user's wrist region. The mobile terminal includes a muscle sensor that is configured to sense movement of muscle in the user's wrist region, and a proximity sensor that is configured to sense a proximity of the mobile terminal to the user's wrist region. The mobile terminal also includes a wireless communication unit configured to perform communication with a vehicle control device provided in a vehicle. The mobile terminal further includes a controller configured to transmit a control command to the vehicle control device based on at least one of a value measured by the muscle sensor or a value measured by the proximity sensor.

21 Claims, 22 Drawing Sheets

(56) References Cited

OTHER PUBLICATIONS

Korean Office Action dated May 20, 2015 for Korean KR Application No. 10-2014-0057920, 4 pages.
Wearable smart key Nymi, Using your heart rate as a means of authentication; Oct. 9, 2013; The Verge, 9.3 & Techvibes, 9.20 & EurekAlert, 9.23.
MYO—recognition muscle motion control (htttps://www.youtube.com/watch?v=yr4h7QB5Jal); CNET Korea, Feb. 23, 2014.

\* cited by examiner (a)  (b)

(a)  (b)  (c)

MOBILE TERMINAL AND VEHICLE CONTROL

CROSS-REFERENCE TO RELATED APPLICATION

Pursuant to 35 U.S.C. §119(a), this application claims the benefit of an earlier filing date and right of priority to Korean Application No. 10-2014-0057920, filed on May 14, 2014, the contents of which are incorporated by reference herein in their entirety.

TECHNICAL FIELD

This application relates to a mobile terminal for remotely controlling a vehicle, and a control method thereof.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

In addition, various types of mobile terminals have been developed with user convenience in mind. Among them, wearable devices include various types of electronic devices that are wearable on a user's body or user's clothes. Such wearable devices include, for example, smart watches, wearable computers, digital eyeglass, Bluetooth headsets, and other smart wear.

SUMMARY

In one aspect, a mobile terminal is configured to be worn on a user's wrist region. The mobile terminal includes a muscle sensor configured to sense movement of muscle in the user's wrist region and a proximity sensor configured to sense a proximity of the mobile terminal to the user's wrist region. The mobile terminal also includes a wireless communication unit configured to perform communication with a vehicle control device provided in a vehicle. The mobile terminal further includes a controller configured to transmit a control command to the vehicle control device based on at least one of a value measured by the muscle sensor or a value measured by the proximity sensor.

According to some implementations, the control command is a control command for opening a door, a trunk, or a window of the vehicle.

According to some implementations, the controller is further configured to determine a distance between the mobile terminal and the vehicle control device, and determine whether or not to transmit the control command to the vehicle control device based on the distance between the mobile terminal and the vehicle control device.

According to some implementations, the controller is configured to determine, at a distance between the vehicle control device and the mobile terminal greater than a threshold distance, that a value measured by the muscle sensor is equal to or greater than a threshold value, and transmit, at a distance between the vehicle control device and the mobile terminal smaller than a threshold distance, the control command to the vehicle control device.

According to some implementations, the mobile terminal further includes a location information module configured to determine a location of the mobile terminal, wherein the controller is configured to determine the distance between the mobile terminal and the vehicle control device based on a location of the vehicle control device received through the wireless communication unit and the location of the mobile terminal determined by the location information module.

According to some implementations, the controller is configured to determine whether or not there is muscle movement based on at least one of a movement detected by the muscle sensor or a distance between the mobile terminal and the wrist region detected by the proximity sensor.

According to some implementations, the controller is configured to transmit the control command based on estimating a configuration of a finger or wrist based on a change of muscle movement detected by the muscle sensor.

According to some implementations, the controller is configured to transmit a control command corresponding to an approach direction based on a determined approach direction of the mobile terminal with respect to the vehicle control device.

According to some implementations, the control command is a control command for opening a door of the vehicle corresponding to the determined approach direction.

According to some implementations, the control command is transmitted at a distance between the vehicle control device and the mobile terminal that does not satisfy a threshold distance, and the operation of the vehicle according to the control command is carried out based on determining that a distance between the vehicle control device and the mobile terminal satisfies the threshold distance, regardless of an approach direction of the mobile terminal with respect to the vehicle.

According to some implementations, the mobile terminal further includes an output unit configured to output the approach direction using at least one of a display output, an audio output, or a vibration output.

According to some implementations, the output unit is configured to, based on the approach direction being determined to be different from a preset approach direction, output a guided direction corresponding to the preset approach direction using at least one of the display output, the audio output, or the vibration output.

According to some implementations, the mobile terminal further includes an input unit configured to receive an input indicating a selection of at least one vehicle control device, from among a plurality of vehicle control devices, to which to transmit the control command.

In another aspect, a control method controls a mobile terminal configured to be worn on a user's wrist region. The method includes detecting, using a muscle sensor, movement of muscle in the user's wrist region and detecting, using a proximity sensor, movement of muscle in the user's wrist region. The method also includes transmitting, to a vehicle control device in a vehicle and using a controller that controls a wireless communication unit, a control command based on at least one of a value measured by the muscle sensor or a value measured by the proximity sensor.

According to some implementations, the control command is a control command for opening a door, a trunk, or a window of the vehicle.

According to some implementations, the method further includes determining, using the controller, a distance between the mobile terminal and the vehicle control device, and determining whether or not to transmit the control command to the vehicle control device based on the distance between the mobile terminal and the vehicle control device.

According to some implementations, the method further includes determining, at a distance between the mobile terminal and the vehicle control device greater than a threshold distance, that a value measured by the muscle sensor is equal to or greater than a threshold value, and transmitting, to the vehicle control device and at a distance between the mobile terminal and the vehicle control device smaller than the threshold distance, the control command.

According to some implementations, determining the distance between the mobile terminal and the vehicle control device includes determining, by a location information module, a location of the mobile terminal; and calculating a distance between the mobile terminal and the vehicle control device based on a location of the vehicle control device received through the wireless communication unit and the location of the mobile terminal determined by the location information module.

According to some implementations, detecting, using the proximity sensor, movement of muscle in the user's wrist region is based on a distance between the mobile terminal and the user's wrist region measured through the proximity sensor.

According to some implementations, the method further includes determining an approach direction of the mobile terminal with respect to the vehicle control device, wherein transmitting the control command to the vehicle control device includes transmitting a control command corresponding to the determined approach direction.

According to some implementations, the method further includes outputting, by an output unit, information about the approach direction using at least one of a display output, an audio output, or a vibration output.

According to some implementations, the method further includes outputting, by the output unit and using at least one of the display output, the audio output, or the vibration output, a guided direction that guides the approach direction to a preset approach direction if the approach direction is different from the preset approach direction.

In another aspect, a vehicle control system includes a wearable device. The wearable device includes a muscle sensor and a proximity sensor that are configured to detect movement of muscle in a user's arm, and a wireless transmission unit configured to transmit a control command to a vehicle control device, based on the detected movement by at least one of the muscle sensor or the proximity sensor. The vehicle control system also includes a vehicle that includes the vehicle control device that is configured to receive the control command from the wearable device and to control an operation of the vehicle based on a value of movement of muscle in the user's arm that was measured by at least one of the muscle sensor or the proximity sensor.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1A:
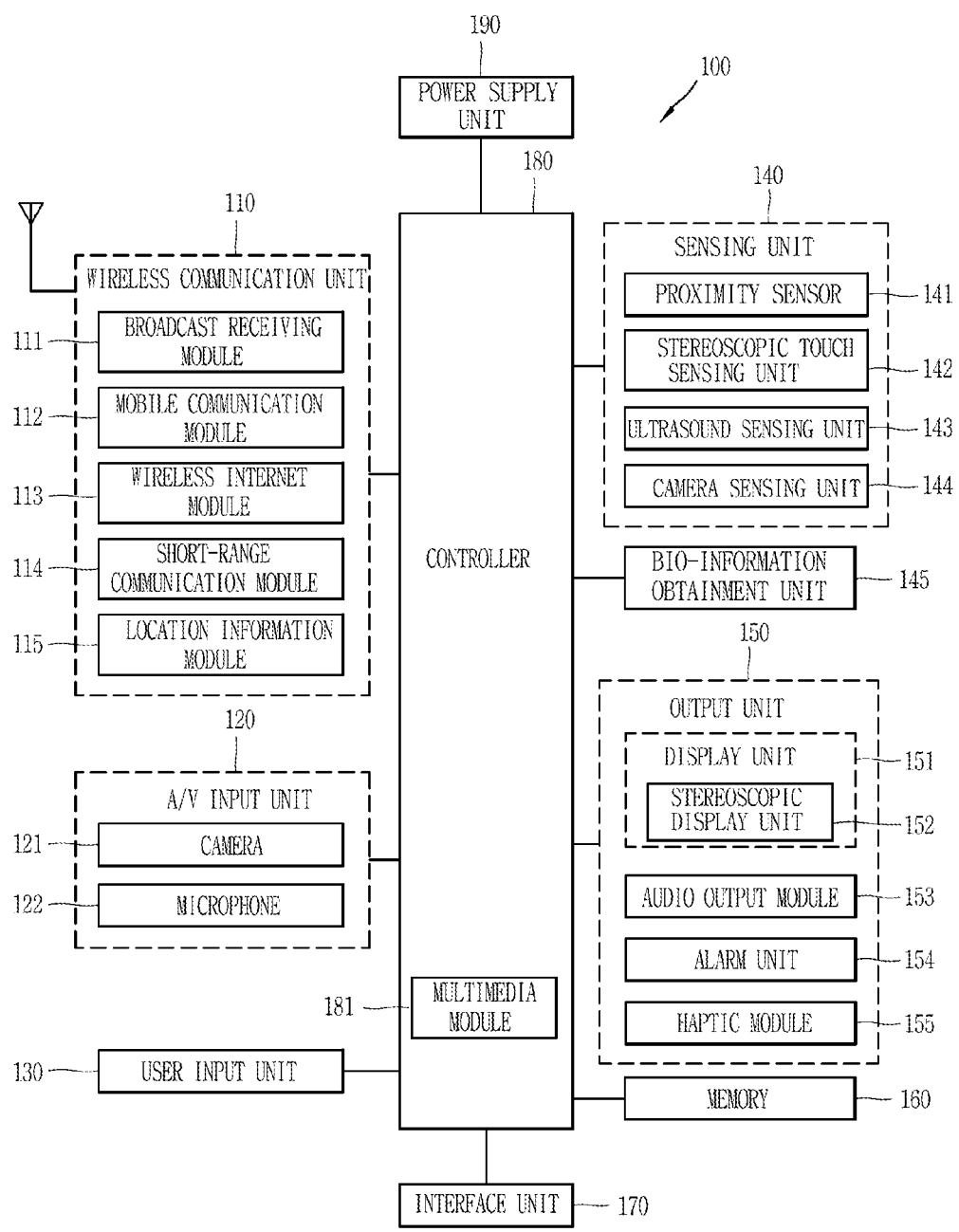
FIG. 1A is a block diagram illustrating an example of a mobile terminal.

A system detects a user's physical condition to remotely control various operations of a vehicle. In some implementations, a mobile terminal (e.g., a smart watch worn by the user) may use one or more sensors to detect that a user is carrying a load in his/her hands, and may automatically control a vehicle to open a door and/or a trunk of the vehicle. In some implementations, the system may also detect a location of the user and may open a door and/or trunk of the vehicle according to the detected location of the user. Such a system may allow a user to more conveniently access a door or trunk of a vehicle without necessarily being required to perform a manual operation while carrying a heavy load.

The system may automatically determine whether a user is carrying a load by detecting movement or non-movement of a muscle on the user's arm. For example, the system may use one or more sensors, such as a muscle sensor and/or a proximity sensor on a wearable device worn by the user (e.g., on a smart watch), to detect muscle movement in the user's arm. In some implementations, utilizing multiple sensors may enhance determination accuracy for whether or not the user is carrying an item.

The system may be applicable to a mobile terminal and a control method thereof. In particular, the system may be applicable to a wearable device linked or connected to a vehicle, and a control method thereof.

Specifically, the system may include a mobile terminal linked or connected to a vehicle control device to perform communication with the vehicle control device provided in the vehicle.

In particular, the system may provide techniques to control various operations of a vehicle from a mobile terminal. Such operations include operation of doors and/or trunks of the vehicle. In addition, the mobile terminal may control other operations of the vehicle (e.g., providing a moving direction to a destination, linked to vehicle navigation).

Various types of mobile terminals may be used with user convenience in mind. For example, wearable devices may include various types of electronic devices that are wearable on a user's body or user's clothes. Such wearable devices include, for example, a smart watch, a wearable computer, digital eye glasses, a Bluetooth headset, and other smart wear.

To perform various functions, the wearable devices may be realized as multimedia devices. For example, the smart watch may function as a watch, and may also capture a static image or may record a moving image with a camera built into it and reproduce multimedia content with a display unit formed in the main body of the watch. In addition, the smart watch may receive incoming messages over a wireless network and connect to a social network with various plug-ins that enable communication (e.g., via e-mail).

Various functions may be possible with a mobile terminal or a wearable device (hereinafter collectively referred to as a "mobile terminal," although this is not intended to be limiting) in order to provide a user with more convenience.

In particular, implementations described herein describe using a mobile terminal in association with operation of a vehicle.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices, and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

A vehicle control device according to some implementations is applied to various pieces of equipment and apparatuses, such as a telematics terminal, a navigation terminal, audio video navigation (AVN) terminal, a television set, a 3D television set, an audio/video (A/V) system, an information providing center, and a call center.

In addition, the vehicle control device according to some implementations is configured to be also in the form of a mobile terminal that is connected to the vehicle in a wired or wireless manner. In this case, like the mobile terminal described above, the vehicle control devices may include a mobile phone, a smart phone, a laptop computer, a digital-broadcast-dedicated terminal, a personal digital assistant (PDA), a portable multimedia player (PMP), a navigation system, a slate PC, a tablet PC, a sub-notebook computer, or a wearable device, and the like.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element.

Some examples of implementations will be described below in detail with reference to the accompanying drawings where those components are rendered the same reference number that are the same or are in correspondence, regardless of the figure number, and redundant explanations are omitted.

Mobile Terminal

Hereinafter, a mobile terminal according to some implementations will be explained in more detail with reference to FIGS. 1A to 5B.

FIG. 1A is a block diagram of an example of a mobile terminal according to some implementations.

As shown in FIG. 1A, the mobile terminal 100 includes a radio communication unit 110, an A/V (Audio/Video) input unit 120, a user input unit 130, a sensing unit 140, a bio-information obtainment unit 145, an output unit 150, a memory 160, an interface unit 170, a controller 180, and a power supply unit 190. FIG. 1A shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to provide radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for a broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a Wireless Fidelity (Wi-Fi) module.

Still referring to FIG. 1A, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides measurements by one or more sensors that are communicative with the mobile terminal 100. For example, such sensors may be configured to detect various conditions of the mobile terminal and/or various conditions (e.g., bio-information) of a user who utilizes the mobile terminal.

For example, the sensing unit 140 may detect various conditions of a mobile terminal, such as an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. As shown in the example of FIG. 1A, the sensing unit 140 may include various sensors, such as a proximity sensor 141, a stereoscopic touch sensing unit 142, an ultrasound sensing unit 143, and a camera sensing unit 144.

The mobile terminal 100 may include one or more proximity sensors (e.g., proximity sensor 141) to detect proximity of different body parts of a user to different portions of the mobile terminal 100. As examples, in some implementations, the proximity sensor 141 may be used to detect proximity of a user's finger (or stylus, or other object used for pointing) to a display screen of the mobile terminal 100. In some implementations, the mobile terminal includes a wearable device and the proximity sensor 141 may be used to detect proximity of a user's skin surface to a portion of the wearable device (e.g., proximity of a skin surface of the user's wrist region to the wrist band of a smart watch). In the latter case, the proximity sensor 141 may be used to detect muscle movement in the user's wrist, which may indicate that the user is carrying a load.

An example of using a proximity sensor to detect proximity of a user's pointer to a display screen will be described with reference to FIG. 1A, below, in the context of controlling a display unit. An example of using a proximity sensor to detect proximity of a user's wrist region to a smart watch will be described with reference to FIG. 8, below, in the context of detecting muscle movement.

In some implementations, a mobile terminal may also include sensors that detect bio-information regarding a user. In the example of FIG. 1A, the mobile terminal 100 includes a bio-information obtainment unit 145 that obtains bio-information through a user's specific body portion. In some implementations, the bio-information obtainment unit 145 may be separate from the sensing unit 140 (as shown in FIG. 1A). Alternatively, in some implementations, the bio-information obtainment unit 145 may be part of the sensing unit 140.

The bio-information obtainment unit 145 may include one or more sensors that detect muscle movement. For example, the bio-information obtainment unit 145 may include a muscle sensor to sense the movement of muscle in the user's wrist region.

The bio-information obtainment unit 145 may also include other sensors that measure a bio-signal that is generated by physiological potential in the human body. Further details of the bio-information obtainment unit 145 are described with reference to FIG. 1B, below.

Still referring to FIG. 1A, the output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

In some implementations, the stereoscopic image may be a three-dimensional (3D) stereoscopic image, and the 3D stereoscopic image is an image refers to an image making a viewer feel that a gradual depth and reality of an object on a monitor or a screen corresponds to a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image includes a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference there between by a depth corresponding to the disparity between the left image and the right image on the screen, providing a stereoscopic space sense.

As illustrated, a left image and a right image for implementing a 3D stereoscopic image is displayed on the stereoscopic display unit 152 by a stereoscopic processing unit. The stereoscopic processing unit may receive the 3D image and extract the left image and the right image, or may receive the 2D image and change it into a left image and a right image.

In some implementations, if the display unit 151 and a touch sensitive sensor (referred to as a touch sensor) have a layered structure there between (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. In some implementations, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched. Various sensors may be used to allow the display unit 151 to function as an input device, such as the sensors in the sensing unit 140 of FIG. 1A.

Still referring to FIG. 1A, a proximity sensor (e.g., proximity sensor 141) may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 may, in some implementations, have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the three dimensional sensor, the sensing units 140 is configured to include a proximity sensor 141, a three dimensional touch sensing unit 142, a ultrasound sensing unit 143, a camera sensing unit 144, and a bio-information obtainment unit 145.

The proximity sensor 141 measures a distance between a sensing target object (for example, a user's finger or a stylus pen) with which a touch is applied without mechanical contact and a sensing surface using the strength of an electromagnetic field or infrared light. The terminal recognizes which part of a stereoscopic image is touched on using the distance. Particularly, a touch screen is a capacitive type, a proximity extent of the sensing target object is sensed with a change in an electric field due to the proximity of the sensing target object. The touch screen is configured in such a manner as to recognize a three dimensional touch using the proximity extent.

The three dimensional touch sensing unit 142 is configured to sense the strength of the touch that is applied to a touch screen or the time for which the touch is applied to the touch screen. For example, the three dimensional touch sensing unit 142 senses a pressure of the applied touch. The three dimensional touch sensing unit 142 determines that the higher the pressure of the touch being applied to an object is, the farther the object is positioned away from the touch screen.

The ultrasound sensing unit 143 is configured in such a manner that positional information on the sensing target object is recognized using ultrasound.

The ultrasound sensing unit 143, for example, is configured from an optical sensor and multiple ultrasound sensors. The optical sensor is formed in such a manner as to sense light, and the ultrasound sensor is formed in such a manner to sense ultrasound. Because light is faster than ultrasound, the time it takes for the light to arrive at the optical sensor is shorter than the time it takes the ultrasound to arrive at the ultrasound sensor. Therefore, a position of a source from which a wave originates is calculated using a difference in arrival time between the light and the ultrasound.

The camera sensing unit 144 includes at least one of a camera, a photo sensor, and a laser sensor.

For example, the camera and the laser sensor may be combined to detect a as touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with an external device connected with the mobile terminal 100. For example, the external devices may transmit data to an external device, receives and transmits power to elements of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied there through to the mobile terminal 100 or may serve as a passage to allow various command signals inputted by the user from the cradle to be transferred to the mobile terminal there through. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power for operating respective elements and components under the control of the controller 180.

Figure 1B:
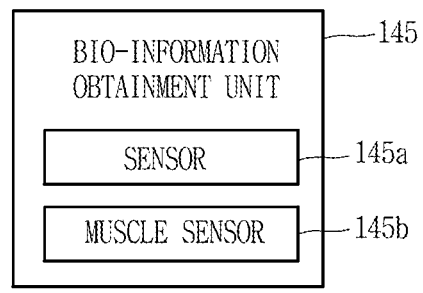
FIG. 1B is a block diagram illustrating an example of a bio-information obtainment unit.

Now referring to FIG. 1B, an example of a bio-information obtainment unit (e.g., bio-information obtainment unit 145 in FIG. 1A) is described. The bio-information obtainment unit 145 may, in general, include any number of sensors that detect information related to a user and, in particular, may detect whether the user is carrying a load. Such information may be utilized for various purposes, for example, to determine whether a trunk and/or door of a vehicle should be automatically opened as the user approaches the vehicle.

In the example of FIG. 1B, the bio-information obtainment unit 145 includes two types of sensors, although fewer or greater number of sensors may be used, as well as other types of sensors that detect bio-information. A first sensor 145a may sense a state of a user's skin or a signal of a user's living body. As examples, the first sensor 145a may be configured to include at least one among a pulse plethyamography (PPG) sensor, an electro-cardiogram (ECG) sensor, a galvanic skin reflex (GSR) sensor, an electro-encephalogram (EEG) sensor, an electro-myogram (EMG) sensor, and an electro-oculography (EOG) sensor. These sensors measure a pulse blood flow, an electrocardiogram, a galvanic skin reflex, an electro-encephalogram, an electro-myogram, and a bio-signal by eye movements.

The bio-information obtainment unit 145 may also include a second sensor 145b that senses a movement of a user's muscle. For example, the second sensor 145b may include one or more muscle sensors that contact the skin surface of the user's wrist region and detect muscle movement. Further details of some examples of muscle sensors are described with reference to FIGS. 7-9, below.

Various implementations described herein may be implemented in a computer-readable or its similar medium using, for example, software, hardware, or any combination thereof.

For hardware implementation, the implementations described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such implementations may be implemented by the controller 180 itself.

For software implementation, procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
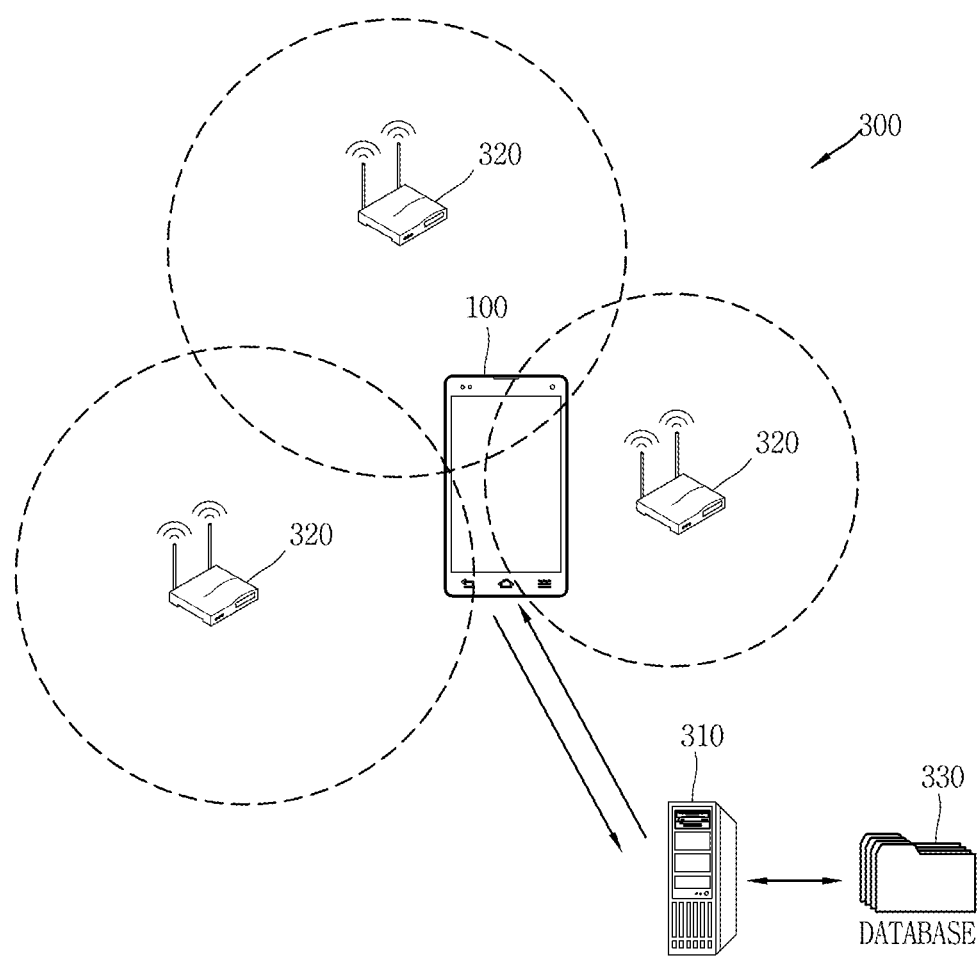
FIGS. 2A and 2B are diagrams illustrating a communication system in which a mobile terminals operable.
Figure 2B:
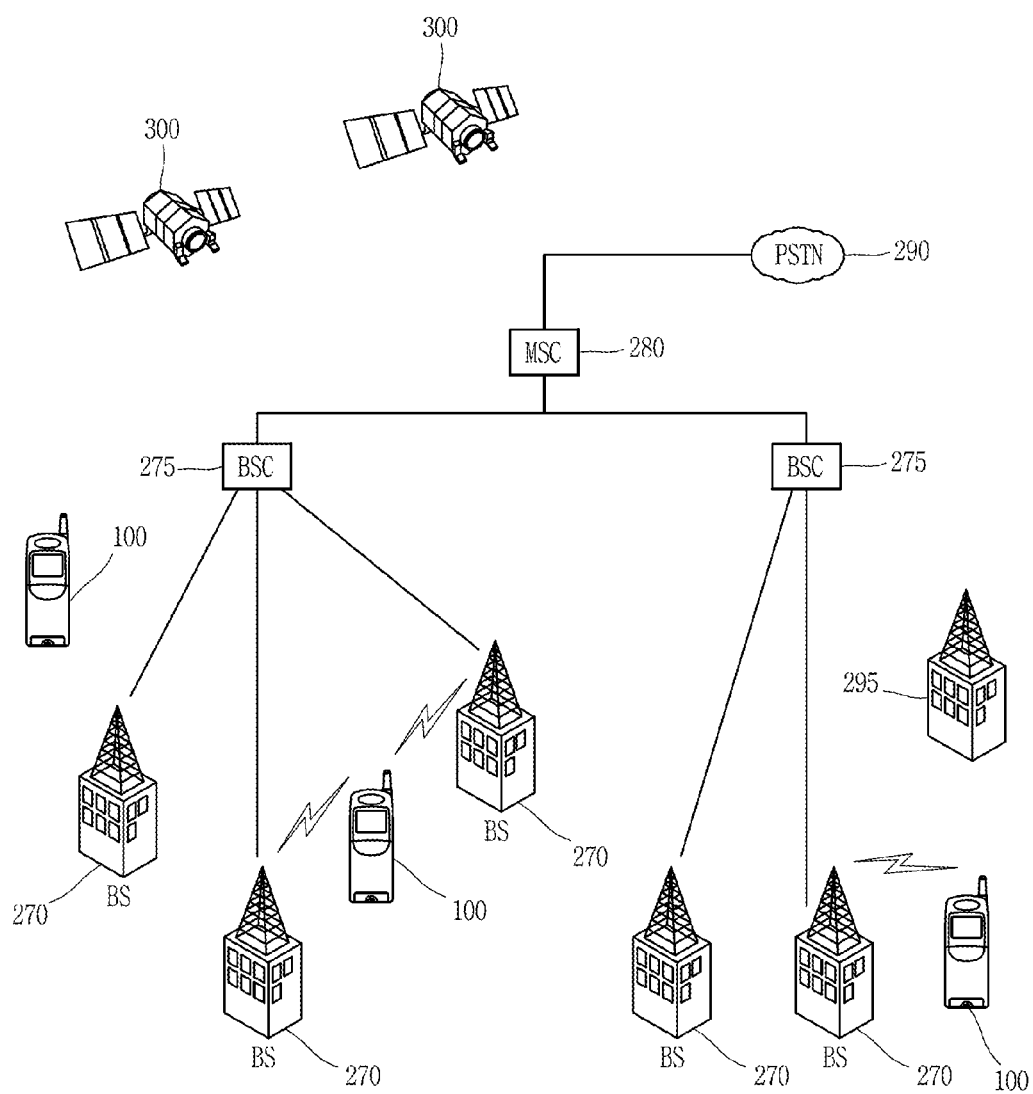

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several interfaces including, for example, E1/T1, ATM, IP, PPP, Frame Relay, HDSL, ADSL, or xDSL. Hence, the plurality of BSCs 275 can be included in the system as shown in FIG. 2A.

The base station 270 may include one or more sectors, the sector having an omni-directional antenna or an antenna pointed in a particular direction radically away from the base station 270. Alternatively, the sector may include two or more different antennas. The base station 270 may be configured to support a plurality of frequency assignments, with the frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1A) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1A) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. The reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

In some implementations, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the display device 100 may be transmitted to the display device 100 through the WiFi location determination server 310, thereby acquiring the location information of the display device 100.

Types of realization of the mobile terminal, disclosed in the present specification, according to some implementations, are described below referring to FIGS. 3A to 5B.

Figure 3A:
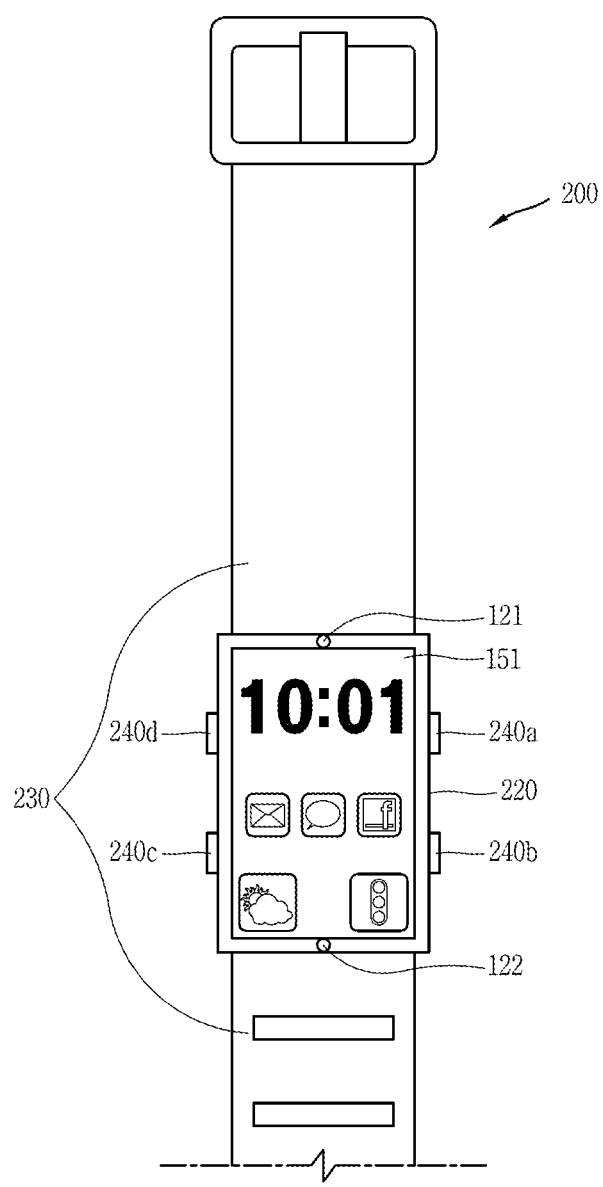
FIGS. 3A and 3B are sketches illustrating examples of the front and rear of a smart watch type of mobile terminal.
Figure 3B:
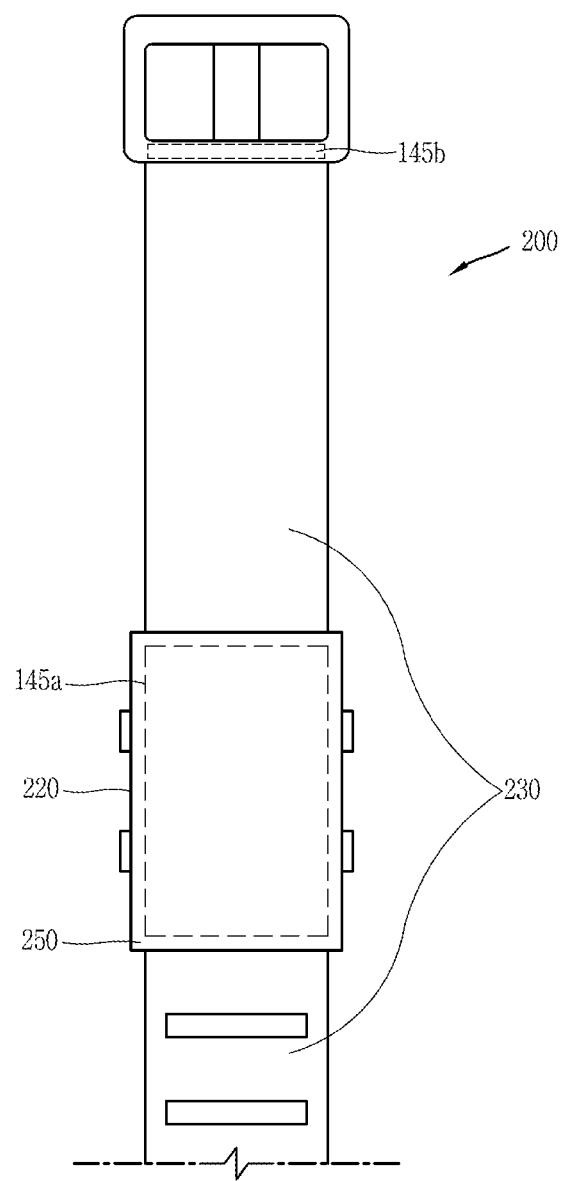

FIGS. 3A and 3B are diagrams illustrating a front side and a rear side of a smart watch according to some implementations.

That is, FIGS. 3A and 3B illustrate a case where the mobile terminal 100 takes the form of a smart watch, which is a watch-type mobile terminal, among wearable devices.

A smart watch 200 that is disclosed in the present specification has rectangular construction. However, implementations are not limited to this, and may be applied to a smart watch having various types of constructions in the shape of a circle, a triangle, or the like.

The smart watch 200 includes a band 230 and a body 220. A case forming an appearance of the body 220 may include a front case 210 and a rear case 250. A space formed by the front case 210 and the rear case 250 may accommodate various components therein. At least one intermediate case may further be disposed between the front case 210 and the rear case 250. Such cases may be formed by injection-molded synthetic resin, or may be formed using a metallic material such as stainless steel (STS) or titanium (Ti).

Referring to FIG. 3A, a display unit 151, a camera 121, a microphone 122, and the like are arranged in the front case 210.

The display 151 occupies most parts of a main surface of the front case 210. A camera 121 and a microphone 122 may be arranged at two ends of the display unit 151.

Various types of visual information may be displayed on the display unit 151. Such information may be displayed in the form of texts, numbers, signs, graphics or icons.

For input of such information, at least one of the texts, numbers, signs, graphics or icons may be arranged in the form of a keypad. Such keypad may be called 'soft key'.

The display unit 151 may be operated as an entire region, or as a plurality of divided regions. In the latter case, the plurality of regions may be associated with each other.

In addition, a wire/wireless headset port (not illustrated) and a wire/wireless data port (not illustrated) are arranged on one lateral face of a main body of the smart watch 200. These ports are configured as one example of an interface 170 (refer to FIG. 1A).

Referring to FIG. 3B, a first sensor 145a is arranged on a rear face of the main body 220, that is, a rear case 250. The first sensor 145a is a sensor that senses a state of a user's skin or a signal of a user' living body. In addition, a second sensor 145b that senses a movement of a user's muscle and the like is arranged on a band 230 of a smart watch.

An antenna for receiving broadcast signals may be disposed on a side surface of the body 220. The antenna, part of the broadcast receiving module 111 (refer to FIG. 1A) may be provided in the body 220 in a retractable manner.

Then, an audio output module (not illustrated), an interface, and the like are arranged in the main body 220 of the smart watch 200. In addition, a user input unit 240, a connection port, and the like are arranged lateral faces of the front case 210 and the rear case 250.

The user input unit 240 is operated to receive a command for controlling the operation of the smart watch 200, which may include at least one of manipulation units 240a, 240b, 240c and 240d. The manipulation units may be referred to as manipulating portions, and may include any type of ones that can be manipulated in a user's tactile manner.

Commands inputted through the manipulation units may be variously set. For instance, the manipulation units may be configured to input commands such as START, END, SCROLL or the like, and configured to input commands for controlling a level of sound outputted from the audio output unit 152, or commands for converting the current mode of the display 151 to a touch recognition mode.

A connection port may be configured to receive data from an external device or to receive power, thereby transmitting it to components inside the smart watch 200. Alternatively, the connection port may be configured to allow data inside the smart watch 200 to be transmitted to an external device. The connection port may be configured as one example of the interface unit 170 (refer to FIG. 1A).

A power supply unit (not illustrated) that supplies electric power to the smart watch 200 is installed in the main body 220 of the smart watch 200. The power supply unit is configured to be in the form suitable to be built into the main body 220.

Vehicle Control Device

The vehicle control device disclosed in the present specification is described below referring to FIGS. 4A to 6C.

Figure 4A:
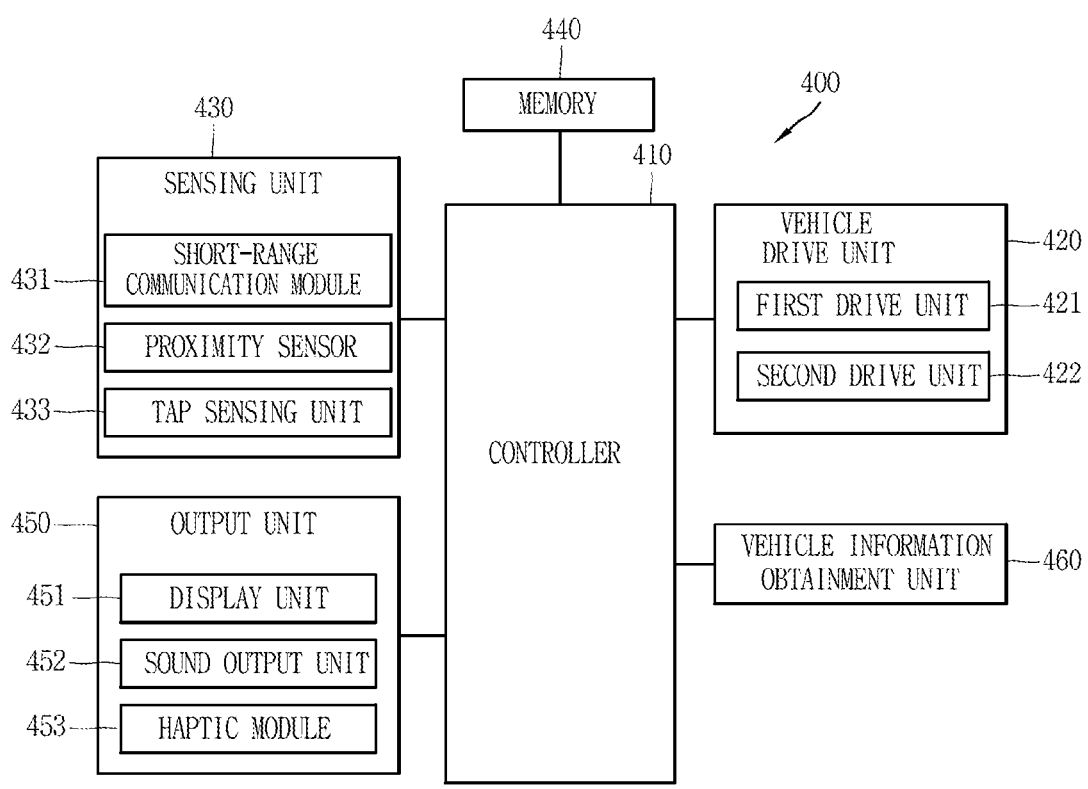
FIG. 4A is a block diagram illustrating an example of a vehicle control device.
Figure 4B:
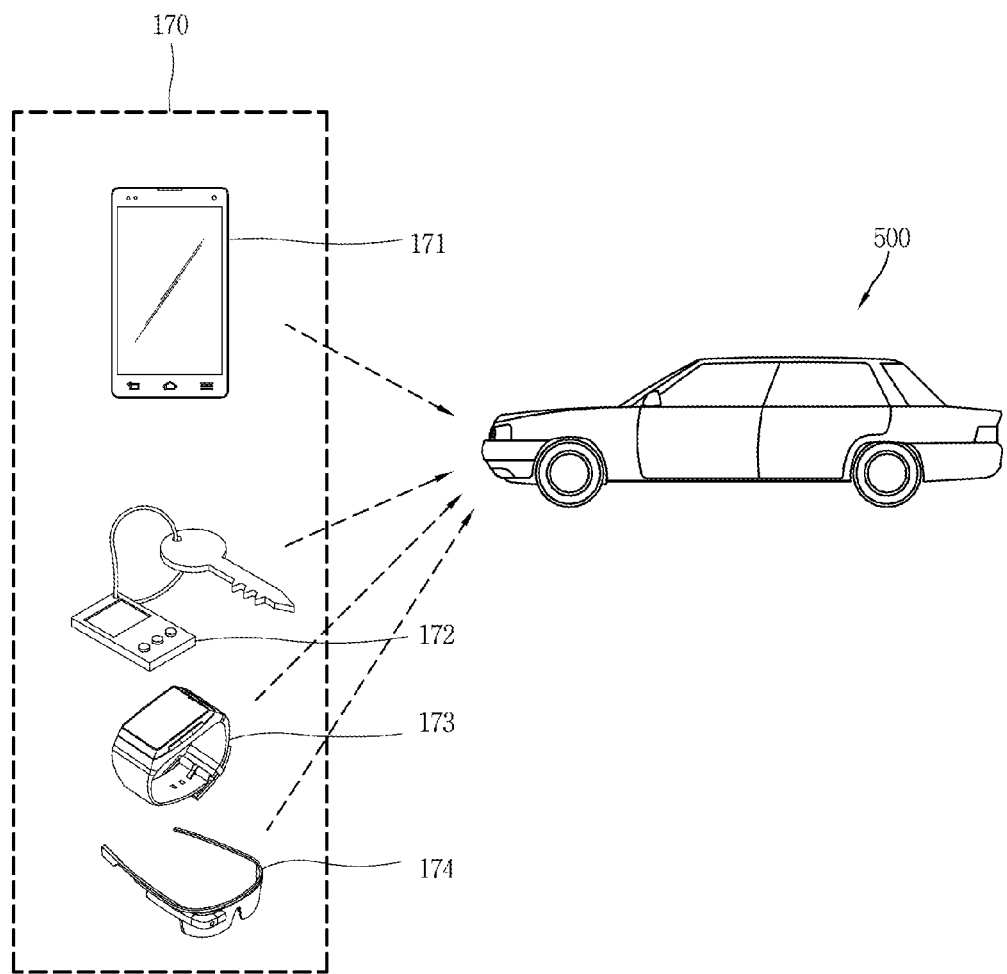
FIG. 4B is a sketch illustrating examples of external devices connected to a vehicle control device.

FIG. 4A is a block diagram of an example of a vehicle control device according to some implementations. FIG. 4B is a diagram illustrating one example of an external device that is connected to the vehicle control device according to some implementations.

FIG. 4A is a block diagram for describing the vehicle control device, disclosed in the present specification, according to some implementations. FIG. 4B is a diagram illustrating an example of the external device that is capable of being connected to the vehicle control device, disclosed in the present specification, according to some implementations.

First, as illustrated in FIG. 4A, a vehicle control device 400, disclosed in the present specification, according to some implementations, is configured to include a controller 410, a sensing unit 430 connected to the controller 410, a vehicle drive unit 420, and a memory 440. The vehicle control device 400 may further include an output unit 450. Then, the vehicle control device 400 is formed in a body of a vehicle that is configured to include an external frame that makes up an external appearance of the vehicle, a window, and an internal frame which is formed in such a manner that the user rides in. At this point, the constituent elements illustrated in FIG. 4A are not essential in realizing the vehicle control device 400 according to some implementations, and thus the vehicle control device 400 described in the present specification may include one or more constituent elements in addition to the constituent elements described above and may omit one or more constituent elements.

The sensing unit 430 is typically implemented using one or more sensors configured to sense internal information of the vehicle control device 400, the surrounding environment of the vehicle control device 400, user information, and the like. For example, the sensing unit 430 is shown having a proximity sensor 432 and an illumination sensor. If desired, the sensing unit 430 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor, a microphone 122, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control device 400 may be configured to utilize information obtained from sensing unit 430, and in particular, information obtained from one or more sensors of the sensing unit 430, and combinations thereof.

The sensing unit 430 may further include a short-range communication module 431. The short-range communication module 431 for short-range communication may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB). The short-range communication module 431 may support wireless communication between the vehicle control device 400 and an external device 170 (refer to FIG. 4B) through wireless area networks.

The external device may be the mobile terminal 100 described above. Particularly, the external device may be in the form of the wearable device 200 or 200', which is one type of the mobile terminal described above.

The vehicle drive unit 420 cancels a locked state of the vehicle or switches the vehicle to the locked state. At this point, the locked state of the vehicle is a state where one or more of or all of the functions of the vehicle are limited, the vehicle does not start, or a door of the vehicle does not open. As opposed to the locked state, the canceling of the locked state makes the vehicle return to a state where, at least one among a driver seat, a front passenger seat, rear passenger seats, and a trunk can open, all the functions of the vehicle can be performed, that is, the vehicle can start, or various functions, such as a navigation function and a ventilation function, can be performed.

In addition, the vehicle drive unit 420 changes various settings and enables a function to be automatically performed. For example, the vehicle drive unit 420 controls constituent elements of the vehicle under the control of the controller 410, for example, controls the extent to which a window of the front driver seat or the front passenger seat is opened or controls an angle of a rear view mirror. The vehicle drive unit 420 adjusts a height or a horizontal position (for example, a distance between the seats) of at least one among the front driver seat or the front passenger seat and the rear seats. The vehicle drive unit 420 may set a steering wheel in the driver seat, for example, may set a height of the steering wheel and a sensitivity of the steering wheel and the like under the control of the controller 410. In addition, under the control of the controller 410, the vehicle drive unit 420 may enable a gear to operate in an automatic transmission or in a manual transmission, and in a case of a hybrid vehicle, may enable any one, among a mode of operation of a combustion engine and a mode of operation of an electric motor mode, to be preferentially selected.

In addition, under the control of the controller 410, the vehicle drive unit 420 may change not only a hardware setting state of the vehicle, but also a software setting state of the vehicle. For example, under the control of the controller 410, the vehicle drive unit 420 may enable a predetermined music play list to be displayed or may enable one music item on the predetermined music play list to be automatically reproduced. In addition, the vehicle drive unit 420 may automatically set a predetermined specific destination point and may enable a path to the specific destination point to be automatically displayed though a navigation apparatus. In addition, under the control of the controller 410, the vehicle drive unit 420 may enable a distance from a preceding or following vehicle or a speed of the vehicle to be automatically set at the time of cruise driving of the vehicle.

To do this, the vehicle drive unit 420 is configured to include different sub-drive units, and the sub-drive units change hardware or software setting states of the vehicle, respectively. The sub-drive unit that changes the hardware setting state of the vehicle is referred to as a first drive unit 421, and the sub-drive unit that changes the software setting state of the vehicle is referred to as a second drive unit 422.

At this point, in order to change the hardware setting of the vehicle, the first drive unit 421 is configured to include different constituent elements that change the external frame or the internal frame of the vehicle. For example, the first drive unit 421 may further include a hardware drive unit for adjusting a height of the seat or an angle of the back of the seat, and may further include a unit for adjusting the height of the steering wheel, which is configured to include an elastic member or a pressure member, such as a coil or a spring for elevating or lowering the height of the steering wheel.

In some implementations, the second drive unit 422 is realized as at least one or more application programs or applications. For example, the second drive unit 122 is realized as being in the form that includes any one among application programs for driving the navigation apparatus or an application program for reproducing already-stored medium data (for example, MP3) and the like. These application programs or applications may be those for one among types of drive control of the vehicle.

The output unit 450 is for generating an output associated with a sense of sight, an auditory sense, or a tactual sense, and is configured to include at least one among a display unit 451, a sound output unit 452, a haptic module 453, and an optical output unit 454. The touch sensor is configured to be layered into, or is integrally formed into the display unit 451 on which various pieces of image information is displayed, or is integrally formed into the display unit 451, thereby realizing a touch screen. The touch screen functions as a user input unit 423 that provides an input interface between the vehicle control device 400 and the user, and provides an output interface between the vehicle control device 400 and the user.

The touch screen is realized as on various portions of the vehicle. For example, the touch screen is realized on entire windshield glass in the vehicle or one portion of the windshield glass, and may be realized anywhere on the external surface (surface exposed to outside of the vehicle) or an internal surface (a surface that faces the inside of the vehicle). In addition, the touch screen may be realized on an external or internal surface of a side window in the driver seat, a side window in the front passenger seat, or a window in the rear seat of the vehicle. The touch screen may be realized on a rear view mirror or a sunroof of the vehicle.

In addition, the touch screen may be realized not only on glass such as the window or sunroof of the vehicle, but also on the external or internal frame of the vehicle. For example, the touch screen may be realized on a surface of the external frame of the vehicle, that is, the external frame between the windshield and the window, or between the windows, such as an A-pillar, a B-pillar, or a C-pillar. In addition, the touch screen may be realized on at least one portion (for example, one portion in the vicinity of a door knob of a vehicle door) of the external surface of the vehicle door. The touch screen may be formed also on a surface of a cover of a gear box within the vehicle or on one portion of a cover of a console box. In addition, two or more of the touch screens may be formed on at least one or more different portions of the vehicle.

Data available to various functions of the vehicle control device 400 is stored in the memory 440. Multiple application programs or applications that run on the vehicle control device 400, data and commands for the vehicle control device 400 are stored in the memory 440. At least one or more of these application programs are downloaded from an external server over a wireless communication network. In addition, for basic functions (for example, a vehicle starting function, a navigation function, and vehicle locking and unlocking functions), at least one or more of these application programs are pre-installed on the vehicle control device 400 before shipping. In some implementations, the application program is stored in the memory 440 and is installed on the vehicle control device 400. The controller 400 runs the application program in order that the application program performs operation (or a function) of the vehicle control device.

According to some implementations, the application program may be a navigation program that performs a navigation function.

Pieces of information relating to at least one or more users are stored in the memory 440. At this point, the information relating to the user is authentication information on the user and information relating to various setting conditions of the vehicle that are set by the user himself/herself or are set properly based on the bio-information on the user. The information relating to the user is, for example, setting information relating to indoor temperature or humidity in the vehicle, which is set by the user himself/herself, setting information that depends on a driving habit of the user, or the like. In addition, the information relating to the user may be a record of driving paths along which the user drove. In addition, the authentication information may be information on a password or a pattern that is predetermined by the user, or may be information that is based on the bio-information on the user, such as recognition information on user's fingerprints or irises. In addition, the authentication information may be information relating to a user's gesture.

According to some implementations, the bio-information on the user is obtained by the mobile terminal 100 (or the wearable device 200 or 200').

In this case, the wearable device may further include a communication unit that performs communication with the vehicle control device which is installed in the vehicle and a bio-information obtainment unit that obtains the bio-information on the user from the specific body portion (for example, a wrist portion).

At this point, the communication unit transmits the obtained bio-information on the user to the vehicle control device 400, and the bio-information on the user is stored in the memory 440.

The bio-information is at least one piece of information, among pieces of information on a user's heart rate, user's body fat, user's blood pressure, user's blood sugar, user's lineaments, user's fingerprints, a user's brain wave, and user's irises.

In addition, a program for operation of the controller 410 is stored in the memory 440, pieces of data, (for example, user authentication information, or driving environment setting information) that are input or output may be temporarily stored in the memory 440. Pieces of data on various patterns of vibration and sound that are output when a touch input is applied to the touch screen are stored in the memory 440.

The memories 440 include storage media, such as a flash memory, a hard disk, a solid state disk (SDD), a silicon disk drive (SDD), a multimedia card micro type, a card memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The vehicle control device 400 may operate in association with a web storage apparatus that, like the memory 440, performs a storage function over the Internet.

In some implementations, the controller 410 normally controls entire operation of the vehicle control device 400 in addition to the operation associated with the application programs described above. The controller 410 processes the signal, the data, the information, and the like that are input or output through the constituent elements described above, or controls driving of the vehicle by running the application program that is stored in the memory 440. In addition, the controller 410 controls at least one or more, among the constituent elements that are described referring FIG. 1A, in order to run the application program stored in the memory 440. Furthermore, the controller 410 controls the constituent elements that are included in the vehicle control device 400, in combination of at least two or more of them, in order to run the application program.

In some implementations, the user inputs the authentication information into the controller 410, and the controller 410 determines whether or not the user is an authenticated user, based on the authentication information. The authentication information is recognition information on the user's finger or on a predetermined pattern. In addition, the authentication information is recognition information on user's irises, or information relating to a user's specific gesture. For example, pattern recognition information or finger recognition information is input, as the authentication information, into the controller 410. The pattern recognition information is on multiple-times tapping (for example, multiple taps or multiple knocks) that are applied by the user to one portion of the external or internal surface of the vehicle. The finger recognition information is input through one portion of the external or internal surface of the vehicle, or through a touch screen region that is formed on the window and the window shield glass and the like in the driver seat or the passenger seat. In addition, the controller 410 may recognize the user's gesture that is made inside of or outside of the vehicle, or may recognize the iris information on the user, using the photo sensor or the camera that is provided in the sensing unit 430.

Then, the controller 410 cancels the locked state of the vehicle when the user is an authenticated user. Then, the vehicle control device 400 enables the user to open the door of the vehicle, the trunk, and the like without having to use the key to them. In addition, the controller 410 may make the vehicle start using predetermined authentication information on the user. In addition, the controller 410 may switch the state of the vehicle to the locked state. That is, based on the selection by the authenticated user, the controller 410 may maintain the locked state of the vehicle until the authentication information on the authenticated user is input again. In some implementations, when the authentication information on the user is input from outside of the vehicle in the state where the vehicle is unlocked, based on this, the controller 410 switches the state of the vehicle to the locked state. Then, when the same authentication information is input again in a state where the vehicle is switched to the locked state, the vehicle may be switched back to the unlocked state.

The touch screen is formed on one portion of the vehicle in order that the authentication information on the user is input into the controller 410. Information on user's fingers or information on the user-set pattern is input into the controller 410 through the formed touch screen. Alternatively, a predetermined password may be input into the controller 410. To do this, the controller 410 performs pattern recognition processing that recognizes writing input or picture-drawing input that is applied to the touch screen, as text or an image, respectively. Furthermore, the controller 410 controls one among the constituent elements described above, or a combination of two or more of them in order to realize the vehicle control device 400 according to some implementations, which are described below.

In addition, the controller 410 may display various pieces of image information on the touch screen that is formed on one portion of the vehicle. For example, the controller 410 may display a finger input region for authenticating the user or graphic objects for applying a pattern input on the touch screen, and may display a result of the user authentication, information relating to the currently-authenticated user, or the like.

Then, when the user is an authenticated user, the controller 410 changes the setting state of the vehicle using the user-related information that corresponds to the corresponding user. For example, by controlling the first drive unit 421, the controller 410 adjusts the height of the driver seat or the like, the angle of the back of the seat, or the like and may adjust the indoor temperature or humidity in the vehicle, based on the authenticated information on the user. In addition, based on information that corresponds to the authenticated user, the controller 410 adjusts the extent to which the window of the driver seat and the front passenger seat are opened or controls the angle of the rear view mirror and the like. The controller 410 may adjust the height of the steering wheel and the like.

The controller 410 may change a vehicle operation mode as well according to the authenticated user. For example, the controller 410 may switch a power steering wheel operation mode to a specific mode (for example, a normal mode or a sports mode) according to a preference of the authenticated user. In addition, the controller 110 may switch a gear transmission mode to a manual transmission mode or an automatic transmission mode according to a preference of the authenticated user.

In addition, the controller 410 may change not only such hardware settings, but also software settings. For example, if the authenticated user rides in the vehicle, the controller 410 automatically selects his/her favorite music item or a list containing a music item that he/she previously listens to. In addition, the controller 410 may automatically select a channel of a radio broadcasting system that the authenticated user frequently tunes in and listens to.

In addition, the controller 410 may change various settings of the vehicle, based on the time at which the authenticated user rides in the vehicle. For example, based on the time at which the user is authenticated and on the record of the authenticated driver's driving, the controller 410 searches for a destination point where the authenticated user frequently goes at the corresponding time. That is, if the user has a habit of regularly going "home" after work at between 8:00 pm and 9:00 pm, when the user rides in the vehicle at between 8:00 pm to 9:00 pm, the controller 410 may automatically set the destination point to "home" and display the corresponding path on a display unit of the navigation apparatus, based on the record of the driving.

In this manner, the controller 410 of the vehicle control device 400 according to some implementations enables the user to control the vehicle using the authentication information. As a result, the user can ride in the vehicle and control the vehicle in an easier and more convenient manner. When the user is authenticated, the controller 410 of the vehicle control device 400 according to some implementations adjusts various driving environment settings of the vehicle as well, based on the fact that the user is authenticated, thereby automatically providing his/her favorite driving environment.

In addition, whether or not the user rides in the vehicle, the controller 410 may change the hardware or software settings of the vehicle in a convenient manner, based on the user's selection. For example, the controller 410 may change at least one hardware or software setting, based on the multiple-times tapping on the inside of the vehicle, for example, the console box, the gear box, or the windows in the driver seat or the front passenger seat. As one example, if the user applies the tapping multiple times to the steering wheel of the vehicle, the controller 410 recognizes this and thus may adjust the height of the steering wheel or may change the power steering wheel operation mode from one mode to another.

In some implementations, the controller 410 changes the hardware or software setting state, based not only on the multiple taps, but also on the user's gesture. For example, the controller 410 makes it possible for a camera, a photo sensor, a laser sensor, or an infrared sensor to sense movements of the driver or the passenger who rides in the vehicle. Then, based on the movements of the driver and the passenger, the controller 410 may perform a specific function and adjust a currently-set state. As one example, if the passenger sitting on the front passenger seat make a hand-lowering gesture toward the window in the front passenger seat, the extent to which the window in the front passenger seat is opened is adjusted based on the passenger's gesture. In addition, if a specific gesture (for example, a fingers-flicking gesture or a hands-clapping gesture) is sensed, the controller 410 may reproduce predetermined specific music data, based on the driver's or passenger's gesture.

In some implementations, at least one or more among the constituent elements described above, operate in cooperation with one another to realize operation or control of the vehicle control device 400, or a method of controlling the vehicle control device 400, which are described above, according to various implementations. In addition, the operation or the control of the vehicle control device 400, or the method of controlling the vehicle control device 400 is realized on the vehicle control device 400 by running at least one application program that is stored in the memory 440.

The constituent elements enumerated above are described in more detail below referring to FIG. 4A, before describing the vehicle control device 400 according to the various implementations.

The sensing unit 430 senses at least one among information on the inside of the vehicle control device, information on an surrounding environment of the vehicle control device, and information on the user, and generates a sensing signal corresponding to the sensed information. Based on the sensing signal, the controller 410 controls driving of or operation of the vehicle control device 400, or performs data processing, a function, or an operation associated with the application program that is stored on the vehicle control device 400. Typical sensors among various sensors that can be included in the sensing unit 430 are described in more detail.

The proximity sensor 432 may include a sensor to sense presence or absence of an object approaching a surface, or an object located near a surface, by using an electromagnetic field, infrared rays, or the like without a mechanical contact. The proximity sensor 432 may be arranged at an inner region of the mobile terminal covered by the touch screen, or near the touch screen.

The proximity sensor 432, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 432 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 432 senses a proximity touch and a proximity touch pattern (for example, a proximity touch distance, a proximity touch direction, a proximity touch speed, proximity touch time, a proximity touch position, a proximity touch movement state, and the like). In some implementations, the controller 410 processes data (or information) that corresponds to the proximity touch operation and the proximity touch pattern that are sensed through the proximity sensor 432, and further outputs visual information that corresponds to the processed data, on the touch screen. Furthermore, the controller 410 may control the vehicle control device 400 in such a manner that different operations are performed or different pieces of data (or different pieces of information) are processed depending on whether the touch applied to the same point on the touch screen is a proximity touch or a contact touch.

A touch sensor can sense a touch applied to the touch screen, such as the display unit 451, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 451, or convert capacitance occurring at a specific part of the display unit 451, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 410. Accordingly, the controller 410 may sense which region of the display unit 451 has been touched. In some implementations, the touch controller may be a component separate from the controller 410, the controller 410, and combinations thereof.

In some implementations, the controller 410 may execute the same or different controls according to a type of touch object that touches the touch screen or a touch key provided in addition to the touch screen. Whether to execute the same or different control according to the object which provides a touch input may be decided based on a current operating state of the vehicle control apparatus 400 or a currently executed application program, for example.

The touch sensor and the proximity sensor of the touch screen may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 410, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The sensing unit 430 typically includes at least one a camera sensor (CCD, CMOS, etc.), a photo sensor (or image sensors), and a laser sensor.

Implementing a camera 421 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

As described above, various pieces of image information relating to inputting of the authentication information on the user are displayed on the display unit 451. For example, a graphic object that indicates a region for inputting a user's fingerprint or a graphic object for inputting the pattern information are displayed on the display unit 451 that is formed, as the touch screen, on one portion of the vehicle. In addition, if user authentication is ended, a result of the user authentication and information relating to the currently-authenticated user may be displayed on the display unit 451. These pieces of image information are displayed on at least one portion of the windshield glass of the vehicle, the window in the front passenger seat, or the like. To do this, at least one portion of the window of the vehicle or at least one portion of the windshield glass of the vehicle that is equipped with the vehicle control device 400 according to some implementations is designed in such a manner that the touch input by the user is sensed.

In addition, the display unit 451 is formed on not only the external surface of the windshield glasses and of the window, but also on the internal surface. Then, information that is processed in the vehicle control device 400 may be displayed (or output) on the display unit 451 that is formed on the internal surface.

For example, screen information that is displayed on the display unit 451 that is formed on the internal surface is execution screen information on an application program that is run on the vehicle control device 400, or information on a user interface (UI) and a graphic user interface (GUI) that depend on the execution screen information.

In addition, the display unit 451 may be realized as included in the sensing unit 130. In this case, a result of the sensing by the sensing unit 430, and a result of matching the user authentication information or at least one portion (for example, a name of the user and like) of the authentication information inherent to the user may be displayed on the display unit 451.

Audio data that is stored in the memory 440 is output through the sound output unit 452. A sound signal associated with a function (for example, a user authentication confirmation sound and a user authentication guidance sound) that is performed in the vehicle control device 400 may be output through the sound output unit 452. The sound output unit 452 is configured to include a speaker, a buzzer, and the like.

In some implementations, the output unit 450 of the vehicle control device 400, disclosed in the present specification, according to some implementations, is configured to include the haptic module 453. The haptic module 453 generates various haptic effects that the user can feel. A typical example of the haptic effect that is generated by the haptic module 453 is vibration. If it is sensed that the touch input by the user is applied to the touch screen realized on the external frame of the internal frame of the vehicle, the widow in the form of glass, or the like, the controller 410 outputs haptic information using the haptic module 453. Accordingly, using the haptic information, the user can confirm whether he/she properly input the authentication information.

The strength, pattern and the like of the vibration generated by the haptic module 453 can be controlled by user selection or setting by the controller. For example, the haptic module 453 may output different vibrations in a combining manner or a sequential manner.

Besides vibration, the haptic module 453 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 453 can also be implemented to allow the user to feel a tactile effect through a muscle sensation such as the user's fingers or arm, as well as transferring the tactile effect through direct contact. Two or more haptic modules 453 may be provided according to the particular configuration of the vehicle control device 400.

Various implementations to be explained later may be implemented in a computer or a computer-readable recording medium, by software, hardware, or a combination thereof.

In some implementations, the sensing unit 430 of the vehicle control device 400, disclosed in the present specification, according to some implementations may further include a main body that is configured to be mounted on the body and to come into contact with one portion of a user's body, and a tap sensing unit 433 for sensing a tap on the main body or a tap gesture. At this point, the tap that is sensed in the tap sensing unit 433 of the vehicle control device 400 is a means for inputting the authentication information on the user. In addition, if the user rides in the vehicle, the tap is used as a means for controlling various functions of the vehicle control device 400. Then, the tap is construed to mean a motion of lightly hitting the main body of the vehicle control device 400 or an object, with a tapping tool such as a finger, or a motion of lightly bringing the tapping tool into contact with the main body of the vehicle control device 400 or the object. At this point, the main body of the sensing unit 430 is formed on the body of the vehicle that is configured to include the external frame and the internal frame of the vehicle and the window or the windshield glass.

In some implementations, the tapping tool with which the tap is applied is a thing that applies an external force to the main body of the vehicle control device 400 or the object, such as a finger, a stylus pen, a pen, a pointer, and a fist. In some implementations, the tipping tool is not necessarily limited to the thing that can be applied to the vehicle control device 400 according to some implementations, and any type of thing may be possible as long as it can apply the external force to the main body of the vehicle control device 400 or the object.

In some implementations, the object to which the tap gesture is applied is at least one among the main body of the vehicle control device 400 and the object that is placed on and on the vehicle control device 400.

In some implementations, the tap or the tap gesture is sensed by at least one among an acceleration sensor and a touch sensor that are included in the tap sensing unit 433. At this point, the acceleration sensor is a sensor that is capable of measuring dynamic forces, such as acceleration, vibration, and impact, which are applied to the main body of the vehicle control device 400.

That is, the acceleration sensor senses vibration (or a movement) of the main body of the vehicle control device 400, which occurs due to the tap gesture, and thus senses whether the tap is applied to the object. Therefore, the acceleration sensor senses the tap on the main body of the vehicle control device 400 or senses that an object that is positioned close to the main body of the vehicle control device 400 to such an extent that it can be sensed whether the movement or the vibration occurs in the main body of the vehicle control device 400 is tapped on.

In this manner, as long as the sensing of the movement or the vibration of the main body of the vehicle control device 400 is possible, the acceleration sensor senses not only the application of the tap to the main body of the vehicle control device 400, but also senses the application of the tap to points other than the main body.

In the vehicle control device 400 according to some implementations, in order to sense the tap on the vehicle control device, one among the acceleration sensor and the touch sensor is used, the acceleration sensor and the touch sensor are sequentially used, or the acceleration sensor and the touch sensor are used at the same time. In some implementations, a mode in which the acceleration sensor is used to sense the tap is referred to as a first mode, a mode in which the touch sensor is used to sense the tap is referred to as a second mode, and a mode in which the acceleration sensor and the touch sensor are all utilized (at the same time or sequentially) to sense the tap is referred to as a third mode or a hybrid mode.

In some implementations, if the tap is sensed through the touch sensor, it is possible to more accurately recognize a position at which the tap is sensed.

In some implementations, in the vehicle control device 400 according to some implementations, in order to sense the tap through the acceleration sensor or the touch sensor, the display unit 451 of the vehicle control device 400 also operates in an inactivated state in a specific mode in which a minimum amount of current or electric power is consumed. The specific mode is referred to as a doze mode.

For example, in the dose mode, a light-emitting element for outputting a screen is turned off and the touch sensor is turned on in the display unit 451 in a touch screen structure in which the touch sensor is layered into the display unit 451. In addition, the dose mode is a mode in which the display unit 451 is turned off and the acceleration sensor is turned on. In addition, the dose mode is a mode in which the display unit 451 is turned off and the touch sensor and the acceleration sensor are all turned on.

Therefore, in the dose mode, that is, in a state where the display unit 451 is turned off (in a state where the display unit 451 is inactivated), if the user applies the tap to at least one point on the touch screen that is formed on one portion of the vehicle, or to a specific point on the main body of the vehicle control device 400, it is sensed that the tap is applied from the user, through at least one among the touch sensor or the acceleration sensor that is turned on.

In addition, in order to distinguish between a tap as a means for inputting the authentication information on the user or a tap as a means for controlling a function of the vehicle control device 400, and a simple collision of an outside arbitrary object with the touch screen, if the tap is applied two or more times within a reference time to the touch screen formed on one portion of the vehicle, it is determined that the "tap" is sensed for inputting the authentication information on the user and controlling the vehicle control device 400. For example, if it is determined that as a result of the sensing by the tap sensing unit 433, the tap is applied one time to the touch screen formed on one portion of the vehicle, the controller 410 may recognize that the outside arbitrary object or an human body collides with the touch screen, without recognizing that the one-time tap is for inputting the authentication information on the user.

Therefore, if the tap sensing unit 433 senses that the tap is applied at least two or more times (or multiple times) consecutively within the reference time, it is determined that the "tap" as the means for inputting the authentication information on the user or as the mean of controlling the function of the vehicle control device 400 is sensed.

That is, the tap gestures mean that the tap gesture is to be sensed at least two or more times consecutively within the reference time. Therefore, the sensing of the "tap" hereinafter means that it is sensed that a user's finger or an object such as a touch pen is lightly hit substantially multiple times on the main body of the main body of the vehicle control device 400.

Furthermore, the controller 410 may make it possible not only to sense the tap within the reference time, but also to determine whether the taps applied using user's different fingers are sensed or the taps applied using one finger of the user are sensed. For example, if it is sensed that the taps are applied to one predetermined portion of the vehicle, that is, one portion of the window of the vehicle or one portion of the window shield glass, an A-pillar, a B-pillar, a C-pillar, a sunroof, one portion of a vehicle door, or a console box or a gear box in the vehicle, the controller 410 makes it possible to sense whether the taps are applied using one finger or using different fingers, using fingerprints that are sensed from the portion to which the taps are applied. In addition, the controller 410 recognizes a position on the display unit 451, at which the taps are sensed, or acceleration that is generated due to the taps, through at least one, among the touch sensor and the acceleration sensor that are provided in the tap sensing unit 433. Thus, the controller 410 makes it possible to sense whether the taps are applied using one finger or using different fingers.

Furthermore, considering additionally an angle at which the tap is applied and a distance between points to which the tap is applied or a direction in which the fingerprint is recognized, the controller 410 determines whether the taps are applied using one finger or using both hands or at least two fingers.

In some implementations, the taps mean multiple-times tapping that are sensed consecutively within the reference time. At this point, the reference time is a very short time, for example, a time in a range of 300 ms to 2 s.

To do this, when the tap sensing unit 433 senses that the main body of the vehicle control device 400 is tapped on, the tap sensing unit 433 senses whether the next tapping is applied consecutively within the reference time after the first tapping sensed. Then, if the next tapping is sensed within the reference time, the tap sensing unit 433 or the controller 410 determines that the tap is sensed for inputting the authentication information on the user or for controlling a specific function of the vehicle control device 400 according to some implementations. In this manner, if a second tap is sensed within a predetermined time after a first tap is sensed, the controller 410 recognizes the first and second taps as "effective taps." Thus, the controller distinguishes between the tap that is applied to input the authentication information on the user or to control the vehicle control device 400 and the collision of an object with the inside or outside of the vehicle, which occurs unintentionally or due to a user mistake.

There is various method of recognizing the "effective tap." For example, when it is sensed that the second tap is applied a second reference number of times or greater to the main body within a predetermined time after sensing the first tap that is applied a first reference number of times or greater, the controller 410 may recognizes the first and second taps as the "effective taps." At this point, the first reference number of times and the second reference number of times may be the same or be different. For example, the first reference number of times may be 1, and the second reference number of times may be 2. As another example, the first reference number of times and the second reference number of times may be all 1.

In addition, if the tap is applied to within a "predetermined region," it is determined that the "taps" are sensed. That is, when it is determined that the main body of the vehicle control device 400 is first tapped on, the controller 410 calculates a predetermined region from a point at which the tapping is first sensed. Then, if the tapping is consecutively sensed the first or second reference number of times or greater at the "predetermined region" within the reference time after the first tapping is sensed, the controller 410 determines that the first tap or the second tap is applied.

In some implementations, the reference time and the predetermined region that are described above can be variably modified according to some implementations.

In some implementations, the first tap and the second tap may be sensed as a separate tap according to not only the reference time and the predetermined region, but also a position at which a tap is sensed. That is, if the second tap is sensed in a position that is a predetermined distance or above away from the position in which the first tap is sensed. The controller 410 determines that the first tap and the second tap are applied. Then, if the first tap and the second tap are recognized based the position in which the tap is sensed, the first tap and the second tap may both be sensed.

In addition, if the first tap and the second tap are configured from multiple touches, that is, from multiple-times tapping, the multiple touches that make up each of the first tap and the second tap are both sensed. For example, if the first touch that makes up the first tap is sensed and additionally the first touch that makes up the second tap is sensed in a position that is a predetermined distance or above from a position in which the first touch that makes up the first tap is also sensed, the controller 110 makes it possible to enable the first touch that makes up each of the first tap and the second tap. Then, the controller 410 makes it possible to enable an additional touch input, which is sensed in each position. If the touch is sensed the first reference number of times or greater or the second reference number of times or greater, the controller 410 determines that the first tap and the second tap are applied.

In some implementations, when the tap sensing unit 433 senses multiple times that the tap is applied to the main body of the vehicle control device 400, the controller 410 controls not only the user authentication, but also at least one among functions that is executable on the vehicle control device 400. At this point, the functions that are executable on the vehicle control device 400 means all types of functions that is executable or be unable on the vehicle control device 400. At this point, one among the executable functions is a function of an application that is installed on the vehicle control device 400. Then, "an arbitrary function is executed" means "an arbitrary application program is executed or is run on the vehicle control device 400." For example, based on the user's multiple taps that are sensed in the console box, the controller 410 reproduces a music file or controls the navigation apparatus in such a manner that a path to a predetermined destination point is automatically set.

As another example, a function that is executable in the vehicle control device 400 is a function that is necessary for basic driving of the vehicle control device 400. For example, the function necessary for the basic driving is a function of turning on/off an air conditioner or a warm-air circulator provided in the vehicle, a function of starting the vehicle, a function of switching between the locked state and the unlocked state, or the like. In addition, the function necessary for the basic driving is a function of turning a cruise control function of the vehicle on or off.

In some implementations, the controller 410 forms a position for inputting the authentication information on the user, based on a point on the main body or the touch screen at which the tapping by the user is sensed. For example, the controller 410 forms a region for inputting the pattern information, or forms a region for inputting the bio-information on the user, for example, the user's fingerprint, in such a manner that the point at which the tapping by the user is first applied serves the center of the region for inputting the pattern information or the bio-information. In this case, even though the user applies the tap to a different point on the main body or the touch screen each time he/she applies the tap, the point at which the information on the user-set pattern or the bio-information on the user varies each time the user applies the tap. Accordingly, the user can minimize exposure of the authentication information, and this is a safeguard against an illegal act, such as when the vehicle is stolen.

In some implementations, the user authentication information may be also input into the vehicle control device 400 through an external device that is predetermined based on the user's selection. For example, the sensing unit 430 is connected to a predetermined external device outside of the vehicle using a short-range communication module 431. The authentication information on the user may be input into the sensing unit 430 through the short-range communication module 431 and may be authenticated by the controller 410.

The vehicle control device 400 obtains vehicle information from the vehicle.

According to some implementations, the vehicle information is obtained through the sensing unit 430 described above.

According to some implementations, the vehicle control device 400 separately is configured to include a vehicle information obtainment unit 460 that obtains the vehicle information.

At this point, the vehicle information is information relating to at least one, among an air conditioning function of the vehicle, a function of checking whether doors (including a hood, a trunk, a fuel intake) are opened or closed, a function of checking whether the windows are opened or closed, a function of checking whether the sunroof is opened or closed, a charged state of a battery of the vehicle, a place where the vehicle is parked, a function of the navigation apparatus provided in the vehicle, a function of checking whether the vehicle is stolen, an amount of fuel in the vehicle, and the like.

In addition, the vehicle information is configured to further include at least information relating to at least one, among current driving speed of the vehicle, current driving acceleration, mileage, the number of times that the vehicle gains sudden acceleration, the number of times that the vehicle stops suddenly.

To that end, the vehicle information obtainment unit 460 communicates with various sensors provided in the vehicle.

For example, the vehicle information obtainment unit 460 is installed in the vehicle, communicates with an acceleration sensor that measures acceleration of the vehicle, and gathers acceleration information on the vehicle.

In addition, for example, the vehicle information obtainment unit 460 performs communication with a black box provided in the vehicle, and obtains when a vehicle accident occurs. In this case, images associated with the vehicle accident are stored in the memory 440.

An image information obtainment unit 470 obtains image information on the user from an image obtainment apparatus 900.

Like a camera, the image obtainment apparatus 900 is a means for processing image frames for a static image and a moving image, which are captured by an image sensor, and obtains an image of the user.

The number of the image obtainment apparatuses 900 is 1 or greater. The image information obtainment unit 470 obtains the image information from various communication means.

FIG. 4B illustrates an example in which an external device that is predetermined in this manner is connected to the vehicle control device according to some implementations.

Referring to FIG. 4B, the predetermined external device 170 is a mobile terminal, such a phone 171 or a smart key 172 that is carried by the user. In this case, the controller 410 recognizes a serial number of the external device 170. If the external device 170 is positioned within a given distance from the controller 410, the controller 110 automatically recognizes a specific user. Then, the controller 410 receives the authentication information that is input through the external device 170. The authentication information that is input from the external device 170 is transferred to the vehicle control device 400 through a communication module provided in the external device 170 and through the short-range communication module 431 of the sensing unit 430.

In some implementations, the authentication information is the bio-information on the user.

According to some implementations, the bio-information is obtained by the mobile terminal 100 (or the wearable device 200 or 200').

At this point, the bio-information is at least one piece of information, among pieces of information on a user's heart rate, user's body fat, user's blood pressure, user's blood sugar, user's lineaments, user's fingerprints, a user's brain wave, and user's irises.

For example, the authentication information is information on the user's heart rate or fingerprints, recognition information on the user's irises, information on the predetermined password of the user, or information on the pattern that is set by the user. In addition, the authentication information may be information relating to a user's specific gesture.

The authentication of the user is done based on multiple pieces of bio-information or multiple pieces of authentication information.

For example, the user's heart rate and the user's gesture are checked, and then the authentication of the user is done.

To do this, the external device 170 may additionally have a configuration for the user inputting the authentication information, that is, a configuration for executing the same functions as those of at least one or more among the sensors provided in the sensing unit 430 of the vehicle control device 400 according to some implementations or the same functions as those of additional sensors.

For example, the external device 170, such as the smart key 172 or the smart phone 171, may further include a sensing unit that is the same as, is similar to, corresponds to the touch screen into which the user can input the pattern information, or the tap sensing unit 433 which is provided in the sensing unit 430 of the vehicle control device 400. In addition, the external device 170 may further include a fingerprint recognition unit for recognizing the user's fingerprints. In some implementations, the external device 170 may further include an inertial sensor, a gyro sensor, an acceleration sensor, or the like.

In addition, for example, a smart watch 173, which is a watch-type mobile terminal, is configured to include a sensor that obtains the user' heartbeat. In addition, smart glasses 174, which is a glasses-type mobile terminal, is configured to include an iris recognition camera for recognizing the user's irises.

In this case, the user can input the authentication information on him/her using at least one piece of information among the information on the fingerprints, the predetermined pattern information, and the iris recognition information. In addition, the user may input the authentication information on him/her into the external device 170 by making a specific gesture while wearing the external device 170. In this case, according to the user's gesture, the controller 110 of the external device 170 recognizes the user's gesture using information on a change in a position of the external device 170, that is, an acceleration measurement value, an amount of change in gravity, or a value that is obtained by measuring an amount of change in inertia. Thus, the controller 110 makes use of such information as the authentication information. In addition, the external device 170 may recognize that the position is changed, using an image of the user that is input through the camera and the like, and may measure a value that is changed.

In some implementations, if the authentication information is input in this manner, the controller 410 of the vehicle control device 400 controls the driving of the vehicle using the authentication information that is input. For example, the controller 410 may recognize the current user according to the authentication information, and may cancel the locked state of the vehicle and set an internal environment of the vehicle that corresponds to the recognized user. In addition, if the locked state of the vehicle is canceled and the authentication information is input back in a state where the vehicle stops, the controller 410 may return the unlocked state of the vehicle to the locked state.

In some implementations, the vehicle may be controlled immediately using the authentication information on the user, which is input through the external device 170, but the controller 410 may request the user to go through an authentication process one more time. In this case, if the external device 170 is positioned within a given distance from the controller 410 or the authentication information is input through the external device 170, the controller 410 switches the state of the vehicle to a wake up state and prepares for starting the vehicle according to the authentication information that is input from the authenticated user. If in a state where the vehicle switches to the wake up state, the user inputs the authentication information one more time into a predetermined region (for example, the window in the driver seat or in the front passenger seat, the A- or B-, or C-pillar, or the like), the controller 410 authenticates the user according to the input and thus starts the vehicle.

In addition, the example is described above in which an authentication procedure is one more time is performed, but in some implementations, other authentication procedures may be performed without limitation. In addition, the example is described above in which if the authentication information on the user is input through external device 170, the multiple authentication procedures are performed, but the multiple authentication procedure may be applied also to a case where the user inputs the authentication information on him/her directly into the touch screen region that is formed on one portion of the vehicle.

Figure 5:
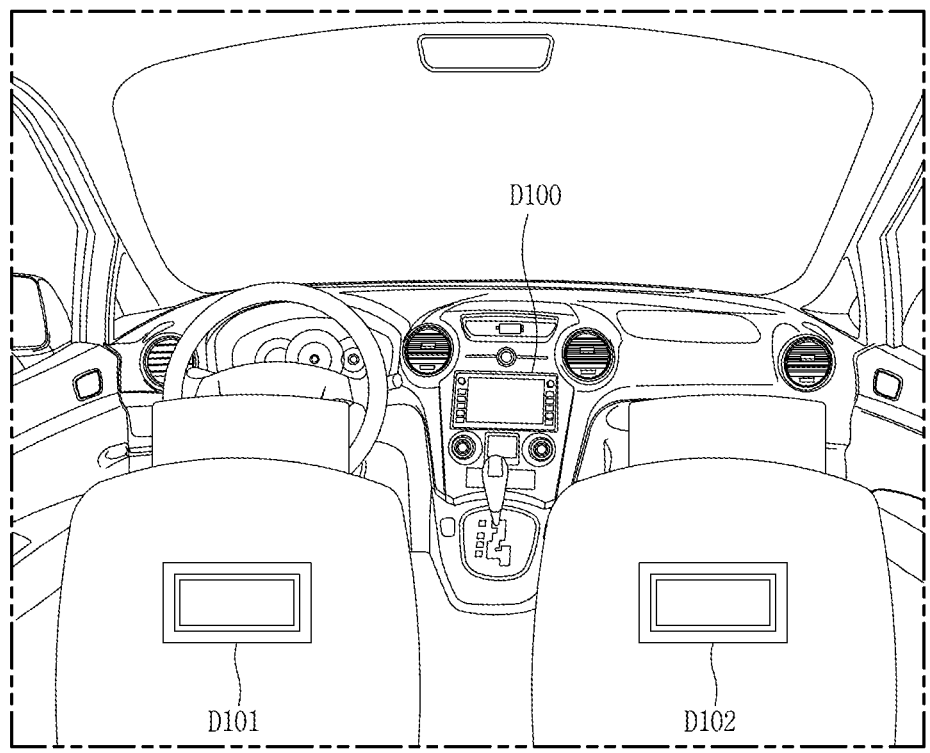
FIG. 5 is a sketch illustrating an example of a display unit in a vehicle control device.

FIG. 5 is a diagram for describing the display unit of the vehicle control device, disclosed in the present specification, according to some implementations.

FIG. 5 illustrates a case where the vehicle control device 400 is realized as in the form of a head unit of the vehicle.

The vehicle control device 400 is configured to include multiple display units D100 to D102.

For example, as illustrated in FIG. 5, the vehicle control device 400 is configured to include one first display unit D100 in front of the driver seat, and two second display units D101 and D102 in front of the rear seats.

In some implementations, the first display unit D100 is subject to regulations for safe driving.

Therefore, the first display unit D100 is subject to vehicle content display regulations, and all content is displayed on the second display units D101 and D102 with any limitation.

Figure 6A:
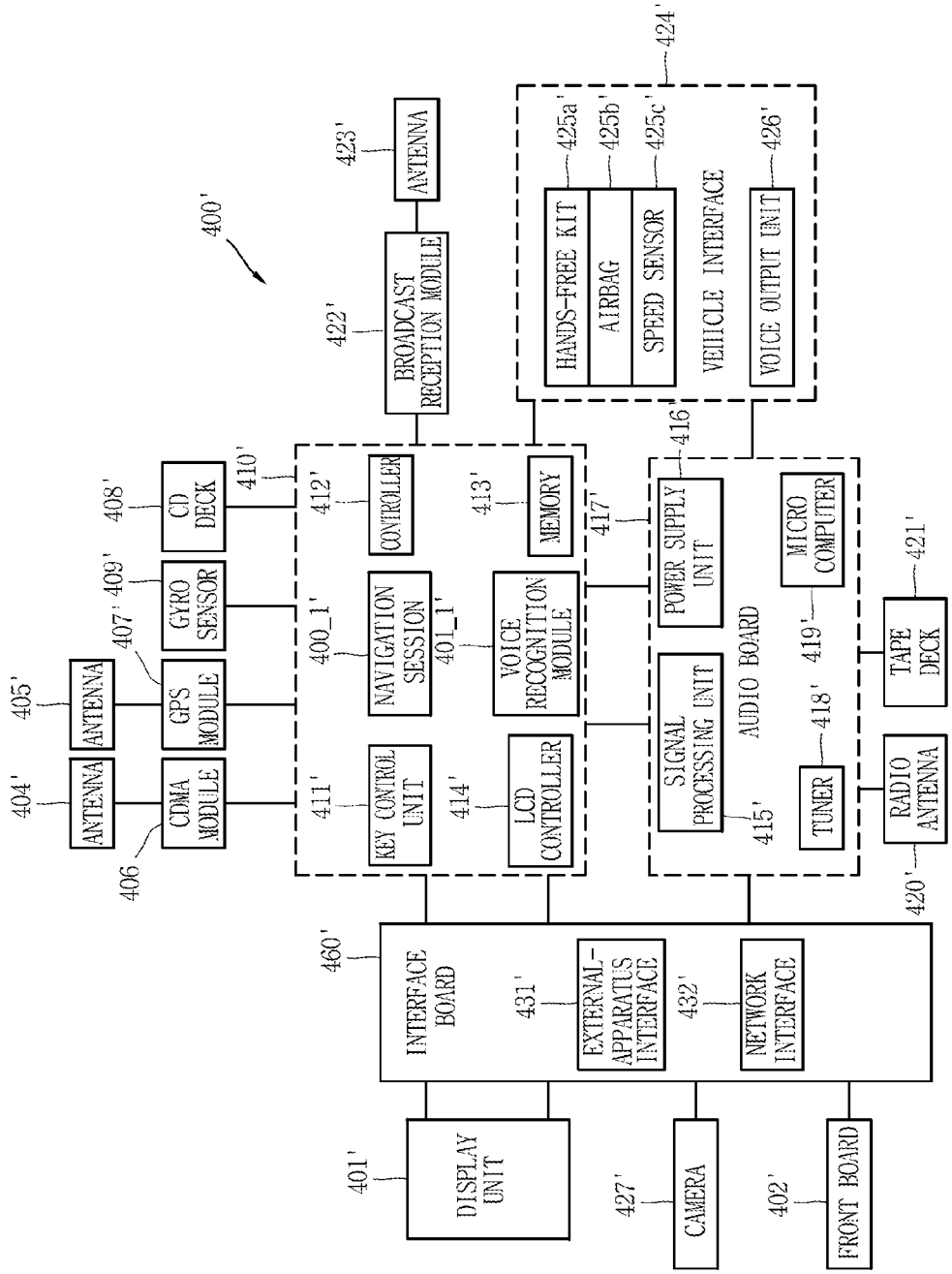
FIGS. 6A and 6B are block diagrams illustrating examples of a vehicle control device.

FIG. 6A is a block diagram illustrating a configuration of the vehicle control device, disclosed in the present specification, according to some implementations.

FIG. 6A illustrates a case where the vehicle control device 400 is realized as in the form of an image display apparatus, a head unit of the vehicle, or a telematics terminal.

As illustrated in FIG. 6A, a vehicle control device 400' is configured to include a main board 410'. A controller (for example, a central processing unit (CPU) 412' that controls all operations of the vehicle control device 400', a program for processing or controlling the controller 412', a key controller 411' that controls various key signals, and an LCD controller 414' that controls a liquid crystal display (LCD) are built into the main board 410'.

Map information (map data) for displaying directions-suggestion information on a digital map is stored in the memory 413'. In addition, a traffic information collection/control algorithm for inputting the traffic information according to a condition of a road along which the vehicle moves currently, and information for controlling the algorithm are stored in the memory 413'.

The main board 410' is configured to include a code division multiple access (CDMA) module 406' that is assigned a serial number and is built into the vehicle, a global positioning system (GPS) module 207 that receives GPS signals for identifying a vehicle position, tracking a driving path from a departure point to a destination point, and so forth, transmits traffic information collected by the user, a CD deck 408' for reproducing signals recorded on a compact disk (CD), a gyro sensor 409' and the like. The CDMA module 406' and the GPS module 407' transmit/receive a signal to/from antennas 404' and 405', respectively.

In addition, a broadcast reception module 422' is connected to the main board 410' and receives a broadcast signal through an antenna 423'. A display unit (LCD) 401' that controlled by the LCD controller 414' through an interface board 430', a front board 402' that is controlled by the key controller 411', and a camera 427' that captures an image of a scene inside of and/or outside of the vehicle are connected to the main board 410'. Various video signals and text signals are displayed on the display unit 401'. Buttons for inputting various key signals are provided on the front board 402'. The front board 410' provides the key signal corresponding to the button selected by the user. In addition, the display unit 401' is configured to include a proximity sensor for the display unit and a touch sensor (touch screen).

A menu key for directly inputting the traffic information is provided on the front board 402'. The menu key is configured in such a manner that the menu key is controlled by the key controller 411'.

The audio board 417' is connected to the main board 410' and processes various audio signals. The audio board 417' is configured to include a microcomputer 419' for controlling the audio board 417', a tuner 418' that receives a radio signal, a power supply unit 416' that supplies electric power to the microcomputer 419', and a signal processing unit 415' that processes various voice signals.

In addition, the audio board 417' is configured to include a radio antenna 420' for receiving the radio signal and a tape deck 421' for reproducing an audio tape. The audio board 417' may be configured to further include a voice output unit (for example, an amplifier) 426' for outputting the voice signal that is signal-processed in the audio board 417'.

The voice output unit (amplifier) 426' is connected to a vehicle interface 424'. That is, the audio board 417' and the main board 410' are connected to the vehicle interface 424'.

A hands-free kit 425a' for inputting the voice signal, an air bag 425b' for driver's or passenger's safety, a speed sensor 425c' for detecting a vehicle speed, and so on may be connected to the vehicle interface 424'. The speed sensor 425c' calculates the vehicle speed and provides information on the calculated vehicle speed to the central processing unit 412'.

A navigation session 400_1' applied to the vehicle control device 400' generates the directions-suggestion information, based on the map data and current position information on the vehicle, and notifies the user of the generated directions-suggestion information.

The display unit 401' senses a proximity touch within a display window through the proximity sensor of the display unit. For example, when a pointer (for example, a finger or a stylus pen) comes into proximity touch with the display unit 401', the display unit 401' detects a position of the proximity touch and outputs positional information corresponding to the detected position to the controller 412'.

A voice recognition device (or a voice recognition module) 401_1' recognizes a voice generated by the user and performs a corresponding function according to the signal of the recognized voice.

The navigation session 400_1' applied to the vehicle control device 400' displays the driving path on the map data. When the position of the mobile communication terminal 100' is within a predetermined distance from a blind spot included in the driving path, the navigation session 400_1' automatically sets up a connection to a terminal (for example, a vehicle navigation apparatus) mounted in the vehicle in the vicinity and/or to a mobile terminal being carried by a pedestrian in the vicinity over a wireless network (for example, a short-range wireless communication network). Thus, the navigation session 400_1' receives the positional information on the vehicle in the vicinity from the terminal mounted in the vehicle in the vicinity and receives the positional information on the pedestrian from the mobile terminal being carried by the pedestrian in the vicinity.

In some implementations, the main board 410' is connected to an interface unit (not illustrated) 430', and the interface unit 430' (not illustrated) is configured to include an external-apparatus interface unit 431' and a network interface unit 432'.

The external-apparatus interface unit 431' connects an external device and the vehicle control device 400'. To do this, the external-apparatus interface unit 431' is configured to include an A/V input/output unit (not illustrated) or a wireless communication unit (not illustrated).

The external-apparatus interface unit 431' is connected, for example, to an external device, such as a digital versatile disk (DVD) player, a Blu-ray disk player, a game apparatus, a camera, a camcorder, or a computer (notebook computer) in a cable or wireless manner. The external-apparatus interface unit 431' transfers to the controller 412' of the vehicle control device 400' an image, a voice, or data signal that is input from outside through the connected external device. In addition, the image, the voice, or the data signal that is processed in the controller 412' is output to the connected external device. To do this, the external-apparatus interface unit 431' is configured to include an A/V input/output unit (not illustrated) or a wireless communication unit (not illustrated).

The A/V input and output unit is configured to include a USB port, a Composite Video Banking Sync (CVBS) port, a composite port, a S-video port (analog), a Digital Visual Interface (DVI) port, a High Definition Multimedia Interface (HDMI) port, a RGB port, a D-SUB port, and the like in order to input an image and a voice signal from the external device to the vehicle control device 400'.

The wireless communication unit performs short-range communication with a different electronic apparatus. The vehicle control device 400' is connected to the different electronic apparatus in accordance with telecommunication standards, such as Bluetooth, Radio Frequency Identification (RFID), Infrared Data Association (IrDA), Ultra Wideband, and ZigBee over the network.

In addition, the external-apparatus interface unit 431' may be connected to various set-top boxes through at least one among the various ports, and may perform an input/output operation while in connection to the set-top box.

In some implementations, the external apparatus interface unit 431' receives an application or an application list that is present in the adjacent external device, and transfers the application or the application list to the memory 413'.

The network interface unit 432' provides an interface for connecting the vehicle control device 400' to a wire/wireless network, such as the Internet. The network interface unit 432' is configured to include, for example, an Ethernet port for the connection to the wire network. For the connection to the wireless network, telecommunication standards are used such as Wireless LAN (WLAN) (Wi-Fi), Wireless broadband (Wibro), World Interoperability for Microwave Access (Wimax), and High Speed Downlink Packet Access (HSDPA).

The network interface unit 432' transmits or receives data to and from the different user or the different electronic apparatus over a connected network, or a different network linked to the connected network. Particularly, one or more pieces among pieces of content data stored in the vehicle control device 400' are transmitted to the user or the electronic apparatus selected from among other users or other electronic apparatuses that are pre-registered with the vehicle control device 400'.

In some implementations, the network interface unit 432' is connected to a predetermined web page over a connected network or a different network linked to the connected network. That is, the network interface unit is connected to the predetermined web page to transmit or receive data to or from a corresponding server. In addition, items of content or pieces of data are received that are provided by a content provider or a network administrator. That is, content, such as a movie, an advertisement, a game, VOD, and a broadcast signal, and information relating to these, which are provided from the content provide or the network administrator, are received. In addition, update information on firmware and an update file, which are provided by the network administrator, are received. In addition, pieces of data are transmitted to the content provider and the network administrator over the network such as the Internet.

In addition, the network interface unit 432' selects a desired application from applications in the public domain, and receives the selected application, over the network.

Figure 6B:
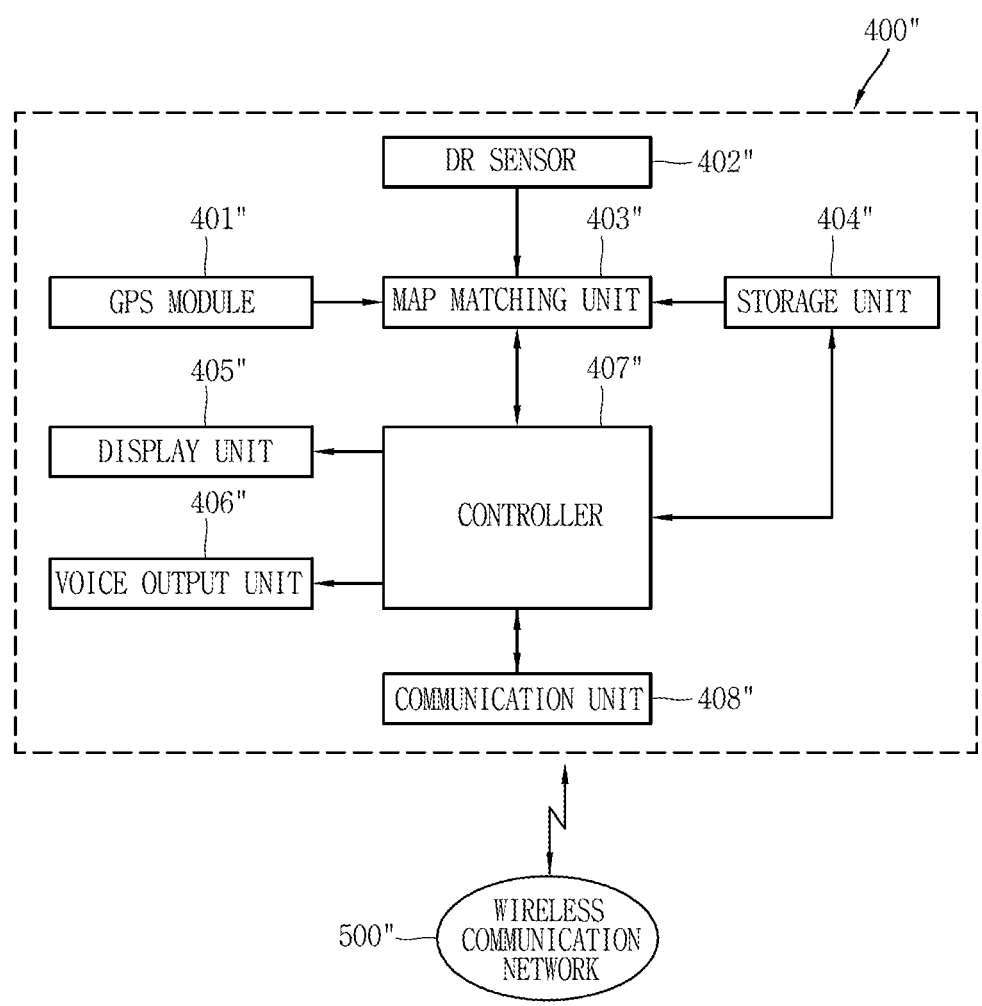

FIG. 6B is a block diagram illustrating a configuration of the vehicle control device, disclosed in the present specification, according to some implementations.

FIG. 6B is a configuration diagram illustrating the vehicle control device 400', focusing on a function of the vehicle navigation apparatus.

If a vehicle control device 400" is realized as the vehicle navigation apparatus, the vehicle control device 400" is categorized into an in-ash type and an on-dash type according to how the vehicle navigation apparatus is installed. The in-dash type navigation (vehicle navigation) apparatus is inserted into a given space secured within a dashboard of the vehicle, and is held in place there. The on-dash type navigation (vehicle navigation) apparatus is held in place on the dashboard of the vehicle, or is held in place in the vicinity of the dashboard using a given support, in a manner that can be attached to and be detached from the dashboard. Thus, in some implementations, the on-dash type navigation apparatus may be portable.

The vehicle control devices 400" according to some implementations include the in-dash type of navigation (vehicle navigation) apparatus and the on-dash type of navigation (vehicle navigation) apparatus. In addition, the navigation (vehicle navigation) apparatuses include all information processing apparatuses that are capable of receiving and/or processing the traffic information, such as various types of portable terminals that are capable of performing a navigation function in cooperation with a GPS receiver within the vehicle, which receives a navigation message that is transmitted from a global positioning system (GPS) satellite.

As illustrated in FIG. 6B, the vehicle control device 400" is configured to include a GPS module 401", a dead-reckoning sensor (DR) sensor 402", a storage unit (or memory) 404", a map mapping unit 403", a communication unit 408", a controller 407", a display unit 405", and a voice output unit 406". The GPS module 401" receives a global positioning system (GPS) signal from the satellite and generates first vehicle position data on the navigation apparatus (whose position is defined as being the same as that of the mobile communication terminal 100), based on the received GPS signal. The dead-reckoning sensor (DR) sensor 402" generates second vehicle position data, based on a driving direction of a vehicle and a speed of the vehicle. The map data and various pieces of information are stored in the storage unit 404" (or memory). The map mapping unit 403" generates a vehicle estimation position, based on the first vehicle position data and the second vehicle position data, matches the generated vehicle estimation position with a link (or a map match link, or a map match road) within the map data stored in the storage unit 404", and outputs the matching-caused map information (the result of map matching). The communication unit 408" receives real time traffic information from an information provision center and/or from the vehicle in the vicinity over a wireless communication network 500", receives traffic light-signal information, and performs telephone communication. The controller 407" generates the directions-suggestion information, based on the matching-caused map information method (the result of map matching). The directions-suggestion map (including information on the point of interest) included in the directions-suggestion information and the traffic signal-light information are displayed on the display unit 405". The voice output unit 406" outputs directions-suggestion voice information (a directions-suggestion voice message) included in the directions-suggestion information and a voice signal corresponding to the traffic light-signal information.

At this point, the communication unit 408" may further include a hands-free kit including a Bluetooth module and may receive a broadcast signal including the traffic information in a TPEG format from the broadcasting station through an antenna. The broadcast signal includes not only audio and video data in accordance with various types of specifications, such as ground wave or satellite Digital Multimedia Broadcasting (DMB), Digital Audio broadcasting (DAB), digital Video Broadcasting (DVB-T and DVB-H), but also additional information, such as traffic information and various types of additional data, which is provided through traffic information (TPEG) service and Binary Format for Scene (BIFS) data service. In addition, the communication unit 408" performs synchronizing on a signal band in which the traffic information is provided, demodulates the synchronized signal, and outputs the demodulated signal to a TPEG decoder (which is included in a controller 407).

The TPEG decoder decodes the traffic information in the TPEG format and provides to the controller 407" various type of information that include the light signal information included in the traffic information.

The directions-suggestion information includes not only the map data, but also various types of information relating to driving, such as traffic lane information, speed limit information, turn-by-turn information, traffic safety information, traffic condition information, vehicle information, path-finding information, and the like.

The signal that is received through the GPS module 401" may be configured in such a manner as to provide the position information on the terminal to the vehicle control device 400" using wireless communication methods proposed by the Institute of Electrical and Electronics Engineers (IEEE), such as IEEE 802.11, IEEE 802.15, IEEE 802.16, and IEEE 802.20. IEEE 802.11 is a set of standard specifications for wireless networks, such as wireless LAN and wireless LAN including one portion of Infrared Communication and so on. IEEE 802.15 is a set of standard specifications for wireless Personal Area Network (PAN) including Bluetooth, UWB, ZigBee, and so on. IEEE 802.16 is a set of standard specifications for wireless Metropolitan Area Network (MAN) (Broadband Wireless Access (BWA)) including Fixed Wireless Access (FWA) and so on. IEEE 802.20 is a set of mobile Internet standard specifications for wireless MAN (Mobile Broadband Wireless Access (MBWA)).

The vehicle control device 400" may be configured to further include an input unit. The input unit is used when the user selects a function that is wanted by the user or inputs information. Various devices, such as a keypad, a touch screen, a jog shuttle, and a microphone, may be used as the input unit.

The map matching unit 403" generates the vehicle estimation position, based on the first vehicle position data and the second vehicle position data, and reads the map data corresponding to the driving path from the storage unit 404".

The map matching unit 403" matches the vehicle estimation position with a link (road) included in the map data and outputs the matching-caused map information (the result of map matching) to the controller 407". For example, the map matching unit 403" generates the vehicle estimation position, based on the first vehicle position data and the second vehicle position data. The map matching unit 403" matches the generated vehicle estimation position with the links within the map data stored in the storage unit 404", in the linking order, and outputs the matching-caused map information (the result of map matching) to the controller 407". The map matching unit 403" may output information on characteristics of roads, included in the matching-caused map information (the result of map matching), such as one-story road and multi-story road, to the controller 407". In addition, a function of the map matching unit 403" may be realized in the controller 407".

The map data is stored in the storage unit 404". At this point, the map data being stored is included to include geographic coordinates (or latitude and longitude coordinates) indicating latitude and longitude in a unit of degree-minute-second (in a DMS unit). At this point, in addition to the geographic coordinates, the map data being stored may include Universal Transverse Mercator (UTM) coordinates, Universal Polar System (UPS) coordinates, and Transverse Mercator™ coordinates.

Various types of information, such as various types of menu screens, points of interest (POI) (hereinafter referred to as "POI"), and information on function characteristics according to a specific position on the map data are stored in the storage unit 404".

Various user interfaces (UI) and/or various graphic user interfaces (GUI) are stored in the storage unit 404".

Data, programs, and so on necessary to operate the vehicle navigation apparatus 400 are stored in the storage 404".

Destination information that is input from the user through the input unit is stored in the storage unit 404". At this point, the destination information is on the destination point, or on any one among the destination point and the departure point.

The image information (or directions-suggestion map) included in the direction-suggestion information generated by the controller 407 is displayed on the display unit 405". At this point, the display unit 405 is configured to include the touch sensor (touch screen) and the proximity sensor for the display unit. In addition, the directions-suggestion information includes not only the map data, but also the various types of information relating to driving, such as the traffic lane information, the speed limit information, the turn-by-turn (TBT) information, the traffic safety information, the traffic condition information, the vehicle information, the path-finding information and the like.

When the image information is displayed, various menu screens and various items of content, such as the directions-suggestion information, are displayed on the display unit 405", using a user interface and/or a graphic user interface that are included in the storage unit 404". At this point, the content that is displayed on the display unit 405" includes the menus screen including various pieces of text or image data (including the map data or various types of information data), a menu screen including icons, a list menus, a combo box, and the like, and the like.

The voice output unit 406" outputs voice information (or a voice message for the directions-suggestion information) included in the directions-suggestion information generated by the controller 407". At this point, the voice output unit 406" may be an amplifier or a speaker.

The controller 407" generates the directions-suggestion information, based on the matching-caused map information, and outputs the generated directions-suggestion information to the display unit 405" and the voice output unit 406". At this point, the directions-suggestion information is displayed on the display unit 405".

The controller 407" receives the real-time traffic information from the information provision center and/or the terminal (vehicle navigation device) mounted in the vehicle in the vicinity and generates the directions-suggestion information.

The controller 407" establishes a connection to a call center through the communication unit 408" and thus makes a telephone call or transmits/receives information between the vehicle control device 400" and the call center. At this point, the communication unit 408" may further include a hand-free module that has a Bluetooth function which uses a short-range wireless communication method.

When a POI search menu is selected by the user, the controller 407" searches for the POI positioned on a path from a current position to the destination point, and displays the resulting POI to the display unit 405". At this point, the controller 407" searches for the POI (a path to the POI does not need to be changed (to be researched for), in which case the POI is positioned to the left or to the right of a driving road) positioned on the path from the current position to the destination point and for the POI (a path to the POI needs to be changed, in which case a predetermined path has to be changed in order to drive by way of the POI in the vicinity) positioned in the vicinity of the path from the current position to the destination point, and displays the resulting POI on the display unit 405".

Figure 6C:
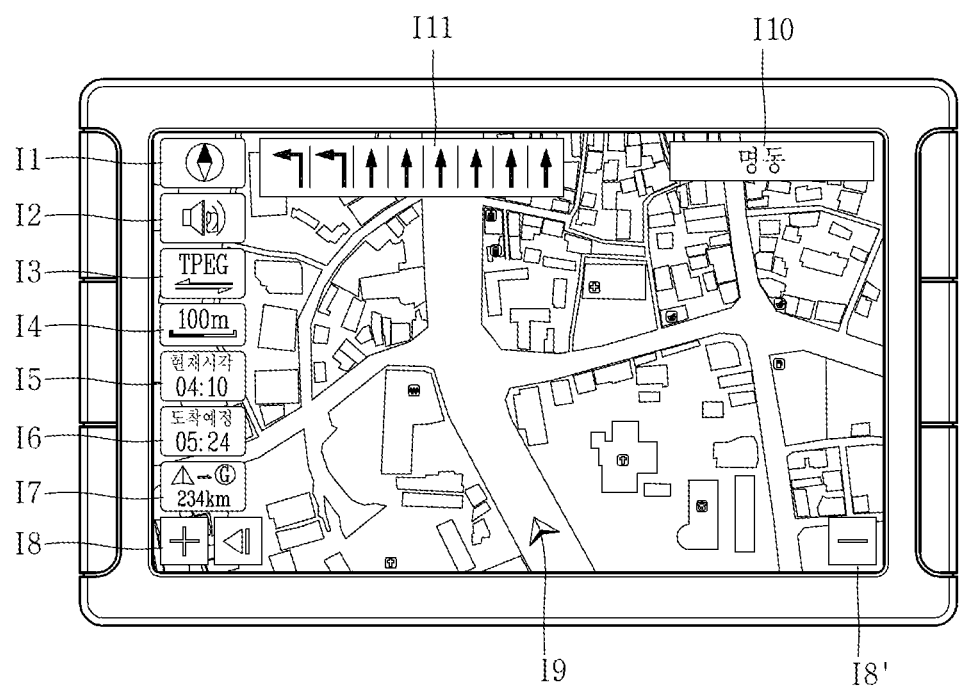
FIG. 6C is a sketch illustrating an example of a screen associated with a navigation function.

FIG. 6C is a diagram illustrating a screen associated with a navigation function, disclosed in the present specification, according to some implementations.

The screen illustrated in FIG. 6C is a screen that is displayed by the mobile terminal 100, the wearable device 200 or 200', or the vehicle control device 400.

If the mobile terminal 100 is realized as in the form of a mobile terminal, a smart phone, a laptop computer, a digital broadcast terminal, a personal digital assistant (PDA), a portable multimedia player (PMP), a wearable device, and the like, one or more among constituent elements illustrated in FIG. 6C may be displayed or none of the constituent elements may be displayed.

As illustrated in FIG. 6C, an icon I1 indicating a compass direction of the map is displayed on one region of the screen on the display unit to which a screen associated with the navigation function is provided. The map is displayed on the display unit to which the screen associated with the navigation function is provided, in such a manner that a specific direction (for example, the true north direction of the Earth), a moving direction of a moving object, a direction of the destination point, and the like are displayed fixed to an upper portion of the screen.

An icon I2 indicating whether or not a sound output module 162 is activated and a volume setting is displayed on one region of the screen on the display unit to which the screen associated with the navigation function is provided. The user can activate or inactivate the sound output module 162 or adjust the volume by applying the touch input to the icon I2.

An icon I3 indicating whether or not a path search function is activated that is in accordance with Transport Portal Experts Group (TPEG) specifications for transmission of traffic information is displayed on one region of the screen on the display unit. Transport Portal Experts Group (TPEG) was found in 1997 by the European Broadcasting Unit for the purpose of establishing protocols for traffic information. In a navigation system, a path suggestion function that uses real time traffic situation information is in accordance with TPEG.

An icon I4 indicating a scale of the map data is displayed on one region of the screen on the display unit.

An icon I5 indicating present time is displayed on one region of the screen in the display unit. In addition, an icon I6 indicating estimated time at which the moving object arrives at a predetermined destination point is displayed on one region of the screen on the display unit. Furthermore, an icon indication estimated time that it takes the moving object to arrive at the predetermined destination point is displayed on one region of the screen on the display unit.

An icon I7 indicating a distance to the predetermined destination point is displayed on one region of the screen on the display unit.

An icon I8 or an icon I8' for increasing or decreasing a size of the displayed map, respectively, is displayed on one region of the screen on the display unit.

An icon I9 indicating a position and a moving direction of the moving object is displayed on one region of the screen on the display unit. The icon I9 may be displayed on a point on the map, which corresponds to the current position of the moving object. In addition, the moving direction of the moving object is displayed as a direction of a sharp point of an arrow in the icon I9, and the like.

An icon I10 indicating a name of a place in which the moving object is located is displayed on one region of the screen on the display unit.

If the vehicle drives down a street, an icon I11 indicating lanes of the street is displayed on one region of the screen on the display unit.

A path to the predetermined destination point 112 (refer to FIG. 6C) is displayed on the display unit. If the destination point of the moving object is not set, the path may not be displayed.

The functions (for example, including the navigation function) that are performed by the vehicle 400 described above are performed the mobile terminal 100 or the wearable device 200 or 200' that is connected to the vehicle control device 400 in a wired or wireless manner.

In addition, the vehicle control device 400 and the mobile terminal 100 may perform functions in cooperation with each other or in conjunction with each other.

To do this, the mobile terminal 100 or the wearable device 200 is configured to include a constituent element that is the same as, is similar to, and corresponds to that included in the vehicle control device 400.

For example, the acceleration sensor provided in the mobile terminal 100 or the wearable device 200 or 200' plays a role of the acceleration sensor included in the vehicle control device 400.

For the cooperation or conjunction between the vehicle control device 400 and the mobile terminal 100, a virtual network computing (VNC) method is applied.

The virtual network computing (VNC) means a graphic desktop sharing system that remotely controls a different computer (or a different terminal) using a RFB protocol in an computer environment.

The VNC transmits keyboard and mouse events or a touch event from one terminal to another, and thus provides a method of updating a graphic screen over the network.

In addition, the functions that are performed by the vehicle control device 400 described above are shared between the vehicle control device 400 and the mobile terminal 100 or the wearable device 200 or 200' and thus are performed.

That is, when it comes to performing a specific function, among all the functions that are performed by the vehicle control device 400 described above, one portion of the specific function is performed by the vehicle control device 400, the other portions of the specific function are performed by the mobile terminal 100 or the wearable device 200 or 200'.

For example, in a case of the air conditioning function for the vehicle, a setting temperature is input into an air conditioner that is provided within the vehicle, by the mobile terminal 100 or the wearable device 200 or 200'. The vehicle control device 400 performs control in such a manner that the air conditioner operates to maintain the setting temperature that is input.

It is apparent to a person of ordinary skill in the art that the technology relating to the vehicle control device, disclosed in the present specification, can be realized in a different form within a range that does not deviate from the technological idea disclosed in the present specification.

Mobile Terminal for Controlling Vehicle by Sensing Movement of User's Muscle

Hereinafter, description will be given of a mobile terminal for controlling a vehicle by sensing a movement of a user's muscle in accordance with some implementations, with reference to FIGS. 7 to 13.

Some implementations will be described based on a wearable type mobile terminal which is worn on a wrist among various types of mobile terminals (hereinafter, simply referred to as "mobile terminal") (see, e.g., FIGS. 3A and 3B).

A mobile terminal in accordance with some implementations, as illustrated in FIGS. 1A, 1B, 3A and 3B, may include one or more sensors, such as a muscle sensor (e.g., muscle sensor 145b) and/or a proximity sensor (e.g., proximity sensor 141) to sense a movement of a muscle of a user's wrist portion, a wireless communication unit 110 to execute communication with a vehicle control device 400, 400', 400'' installed in a vehicle, and a controller 180 to transmit a control command to the vehicle control device when a measured value by the muscle sensor 145b and/or the proximity sensor 141 satisfies a threshold value.

The mobile terminal 100 worn around the user's wrist may sense a movement of the user's muscle and the like by the muscle sensor 145b and/or the proximity sensor 141.

The muscle sensor 145b and/or the proximity sensor 141 may be installed on one portion of a band 230, to sense contraction or non-contraction of the muscle of the wrist.

For example, if a resistance value against pressure, which is sensed by a force sensing resistor (FSR) sensor, is more than a threshold value, it may be determined that a muscle has been contracted. The controller 180 may estimate a hand gesture based on contraction of muscles sensed by a plurality of FSR sensors. Examples of the hand gesture sensed by the muscle sensor 145b may correspond to a clasped state that a hand is closed, and a hand-open state. The muscle sensor 145b may also sense other gestures, such as bending a wrist.

The muscle sensor 145b may be implemented by employing other sensors, as well as the FSR sensor. In detail, the muscle sensor 145b may be implemented as a force sensor or a strain gauge sensor so as to sense whether a muscle is contracted or relaxed and in addition estimate a hand gesture. When the muscle sensor 145b is implemented as the force sensor, the muscle sensor 145b may estimate a hand gesture, similar to employing the FSR sensor. However, when it is implemented as the strain gauge sensor, the muscle sensor 145b may measure an extended/contracted degree of a surface and sense a movement of a hand using the measured value. For example, the muscle sensor 145b may estimate a hand-closed state or a hand-open state based on an extended/contracted degree of the band 230 of the mobile terminal, which is worn around the wrist. In some implementations, the muscle sensor 145b may estimate a bent degree of the wrist in a bent direction.

In such a manner, for sensing the movement of the muscles, one of the FSR sensor, the force sensor and the strain gauge sensor or a combination thereof may be employed.

The mobile terminal disclosed herein may be cooperative with the vehicle control device 400, 400', 400'', in a manner of sensing a movement of a muscle of a user's wrist portion through the muscle sensor 145b and/or the proximity sensor 141, and transmitting a control command to the vehicle control device 400, 400', 400' based on the sensed result.

Figure 11:
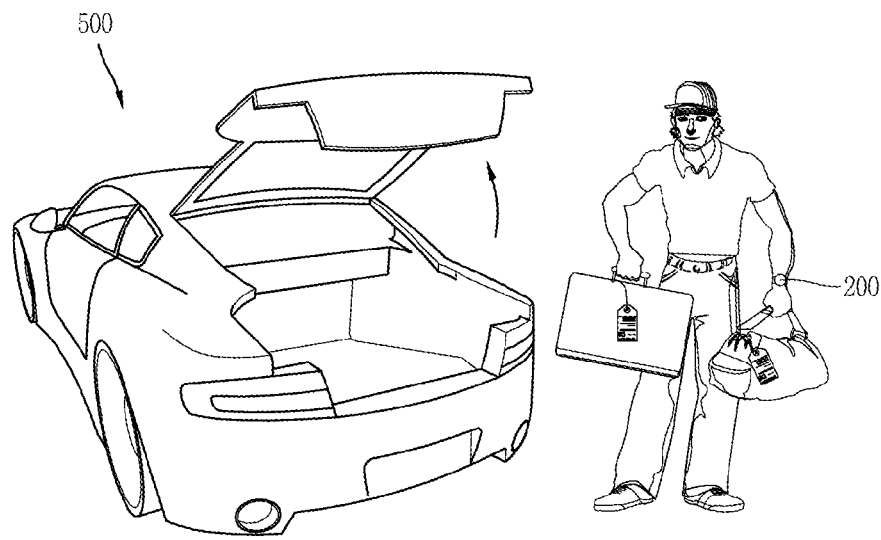
FIGS. 11 and 12 are sketches illustrating examples of using a mobile terminal.

FIG. 11 is an example of a view illustrating a scenario utilizing a mobile terminal in accordance with some implementations.

For example, as illustrated in FIG. 11, when a user who wears the mobile terminal 100 on a wrist holds loads with both hands, the user may put both of the loads down and open a door (or a trunk) of a vehicle 500, in order to put the loads into the vehicle 500.

According to some implementations, a vehicle may be capable of detecting a movement of the user at a close distance to the vehicle (e.g., a movement of a leg underneath the vehicle, etc.) so as to determine whether or not a person approaches, thereby deciding whether or not to open a door of the trunk. For example, in such implementations, a user who is holding loads with both hands may stretch a leg into the lower side of the vehicle where the trunk is located, to make a sensor detect the stretched leg underneath the vehicle, such that the trunk of the vehicle can automatically open.

However, in such implementations, when the user is holding heavy loads, it may be difficult for the user to view the bottom of the vehicle and/or it may be difficult for the user to correctly recognize a location of a bottom of the vehicle. This may cause inconvenience and even a risk of injury to the user. For example, when the vehicle has been parked or stopped at a slippery position or even when the user wears uncomfortable shoes, it may be difficult for the user to balance on one leg and stretch the other leg for detection by the vehicle to make the trunk open.

Therefore, in accordance with some implementations, such difficulties with automatically determining an opening of a trunk and/or door may be mitigated by instead (or additionally) remotely detecting whether the user is holding a load in his/her hands. Thus, even if the user is holding the loads with both hands, even when the loads are big, even when the vehicle has been parked or stopped at the slippery position, or even when the user wears uncomfortable shoes, if the user merely moves or strains a muscle in the wrist portion, the mobile terminal 100 may sense the movement of the muscle of the wrist portion and transmit a corresponding control command, such as a trunk-open command to the vehicle control device, to allow the vehicle to open the trunk.

In some implementations, the vehicle control device 400, 400' and 400'' may receive the control command from the mobile terminal 100 through a communication unit 430, 406', 408', and control the vehicle to be driven according to the control command by using a vehicle driving unit 420.

The mobile terminal 100 may communicate with the vehicle control device 400, 400', 400", as aforementioned, using the wireless communication unit 110 through at least one network. In some implementations, the wireless communication unit 110 may use at least one of the broadcasting receiving module 111, a mobile communication module 112, a wireless internet module 113, a short-range communication module 114 and a position information module 115.

The control command transmitted from the mobile terminal 100 to the vehicle control device 400, 400', and 400" may be a control command with respect to the whole vehicle, such as a vehicle air-conditioning control command, a vehicle switch-on/off command, and the like. However, in some implementations, the control command may be a control command for opening at least one door or window. In some implementations, the door may correspond to doors installed at seats and may also include the trunk.

The control command may be set in a manner that at least one or a plurality of control commands are selected from various types of control commands through a user input unit 130 so as to be transmitted to the vehicle control device 400, 400', 400' according to the sensed movement of the muscle.

When the plurality of control commands are selected, the selected control commands may be set to have orders. Or, when the vehicle 500 is being operated (driven) according to the control commands, preset intervals may be maintained among plural control operations.

When the mobile terminal 100 senses the movement of the muscle and transmits the corresponding control command to the vehicle control device 400, 400', 400", in order to prevent a transmission of a repetitive control command, the plurality of control commands may be transmitted with preset intervals when transmitted.

In some implementations, the controller 180 may estimate a shape or state (bending, or the like) of a finger or a wrist using a sensed movement of a muscle through the muscle sensor 145b, and transmit a corresponding control command to the vehicle control device 400, 400', 400" through the wireless communication unit 110 according to the estimated shape or state (e.g., a gesture or pose) of the finger or wrist.

Figure 9:
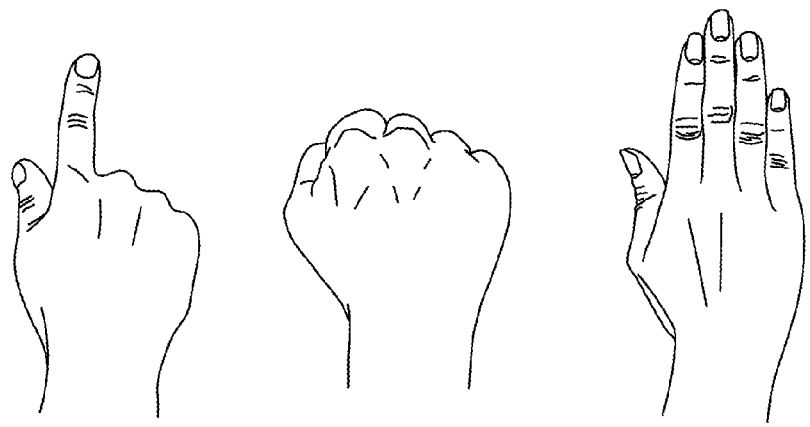
FIG. 9 is a sketch illustrating an example of a form of a user's finger sensed by a mobile terminal.

FIG. 9 is an example of a view illustrating a shape of a user's finger sensed by a mobile terminal in accordance with some implementations.

As illustrated in (a) to (c) of FIG. 9, the controller 180 may estimate a shape of a user's finger that the user poses, and transmit a different vehicle control command to the vehicle control device 400, 400', 400' according to the estimated shape of the finger.

In detail, as illustrated in (a) of FIG. 9, when a shape of a finger that a forefinger is stretched is estimated, the controller 180 may transmit a control command for opening the trunk to the vehicle control device 400, 400', 400". As illustrated in (b) of FIG. 9, when a clasped state is estimated, the controller 180 may transmit a control command, which instructs to open a passenger-side door of the vehicle 500, to the vehicle control device 400, 400', 400". As illustrated in (c) of FIG. 9, when a state that all of the fingers are stretched is estimated, the controller 180 may transmit a control command, which instructs to open a door of a passenger-side rear seat of the vehicle 500, to the vehicle control device 400, 400', 400".

Figure 7:
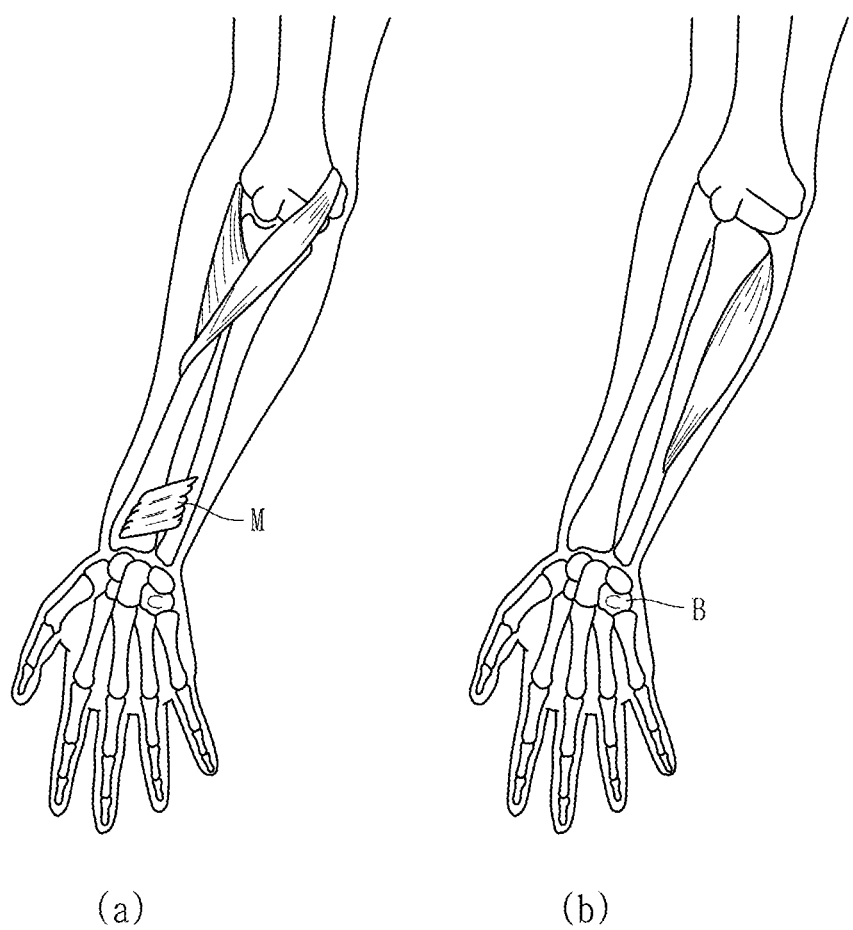
FIG. 7 is a sketch illustrating an example of a muscle distribution in a wrist region of the human body.

FIG. 7 illustrates an example of muscle distribution of a wrist portion of a human body.

As illustrated in FIG. 7, the wrist of the human body may have pronator quandratus (M) located at a front portion thereof. However, the wrist may not have a muscle at a rear portion thereof, with merely having ligaments at upper and lower sides based on a pisiform bone (B).

Here, among the terminology used herein, "front portion" of the wrist denotes a portion an outer surface of the wrist, located in the same direction as a palm, and "rear portion" of the wrist denotes a portion of a rear surface of the wrist, located opposite to the front portion.

In some implementations, the mobile terminal 100 may include a proximity sensor (e.g., proximity sensor 141 in FIG. 1A or another appropriate proximity sensor). In some implementations, the proximity sensor 141 may be located at the front portion of the wrist when the user wears the mobile terminal 100 on the wrist.

Figure 8:
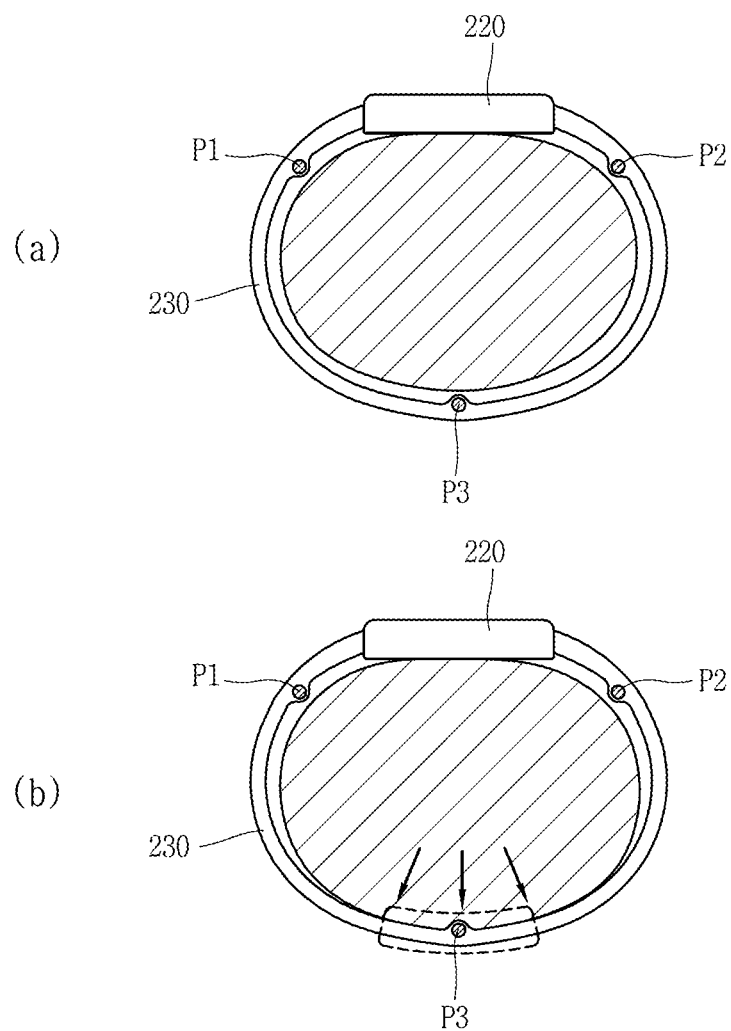
FIG. 8 is a sketch illustrating an example of a longitudinal cross-section of a mobile terminal configured to be worn on a wrist.

FIG. 8 is a longitudinal view of an example of a mobile terminal worn on a wrist in accordance with some implementations.

When a user does not apply a force to a hand, as illustrated in (a) of FIG. 8, a front portion of a wrist may be spaced from a portion of a wearable device (e.g., the band 230 of a smart watch) by a gap. However, when the user applies a force to the hand, as illustrated in (b) of FIG. 8, the pronator quandratus (M) may be contracted such that the front portion of the wrist can come in contact with the band 230 or is spaced from the band 230 by a narrower gap than the gap formed when such force is not applied to the hand.

Therefore, the proximity sensor 141 may be provided at a position (i.e., a position P3 illustrated in FIG. 8) of the band 230, which corresponds to the front portion of the wrist with the pronator quandratus (M), so as to sense a movement of the muscle according to a gap from the band 230 to a skin surface of the front portion of the user's wrist.

In some implementations, the proximity sensor 141 may be located at the front portion of the user's wrist to sense an object in front of the proximity sensor 141. In some implementations, the proximity sensor 141 may sense a movement or non-movement of the muscle according to a gap from the object (e.g., the user's wrist, or other object from which to measure distance from the band 230 that indicates muscle movement) located in front thereof.

When the gap from the front object, measured by the proximity sensor 141, is smaller than a particular value, the controller 180 may determine that a force has been applied to the user's hand, and accordingly transmit a corresponding control command to the vehicle control device 400, 400', 400".

In some implementations, a threshold value, which is a reference that the controller 180 uses to determine whether or not the force has been applied to the user's hand, may be preset by a user, or may be set through a learning algorithm.

For example, the controller 180 may calculate a threshold gap value suitable for a particular user through repetitive learning, such as using a perceptron algorithm used in neural networks or other learning algorithms, based on distances from the front object, measured one or more times by the proximity sensor 141, and then used to set the calculated threshold gap.

In some implementations, the controller 180 may determine the movement or non-movement of the muscle using both the sensing result by the muscle sensor 145b and the movement of the muscle sensed by a proximity sensor (e.g., the proximity sensor 141 in FIGS. 1A and 3B), thereby enhancing determination accuracy for whether or not the user has applied the force.

For example, when the movement of the muscle has been sensed by both the muscle sensor 145b and the proximity sensor 141, the controller 180 may determine that the user has applied a force (e.g., is carrying a load). Accordingly, even though any one sensor may be out of order or an error may be generated in measurement, occurrences of a wrong control for the vehicle 500 due to a faulty operation of the mobile terminal 100 can be mitigated.

To sense the movement or non-movement of the user's muscle, the mobile terminal 100 may repetitively operate the muscle sensor 145*b* and/or the proximity sensor 141 continuously or with a preset interval.

Also, to sense the movement or non-movement of the user's muscle, a measurement timing using the muscle sensor 145*b* and/or the proximity sensor 141 may be limited to a case of meeting a preset condition. For example, when a measured value by an acceleration sensor (not illustrated) provided in the mobile terminal 100 is less than a predetermined value, namely, when a position of a terminal body of the mobile terminal 100 is less changed, the movement or non-movement of the user's muscle may be sensed by the muscle sensor 145*b* and/or the proximity sensor 141.

For example, when the user holds a heavy load, it may be expected that the mobile terminal 100 worn on the wrist is less moved. Accordingly, when the mobile terminal 100 is considerably moved, even if the movement of the muscle is sensed, in some implementations a control command may not be transmitted to the vehicle control device 400, 400', 400".

In some implementations, the mobile terminal 100 may calculate a distance from the vehicle 500, in detail, the vehicle control device 400, 400', 400", and transmit a control command to the vehicle control device 400, 400', 400" according to the calculated distance.

Figure 10:
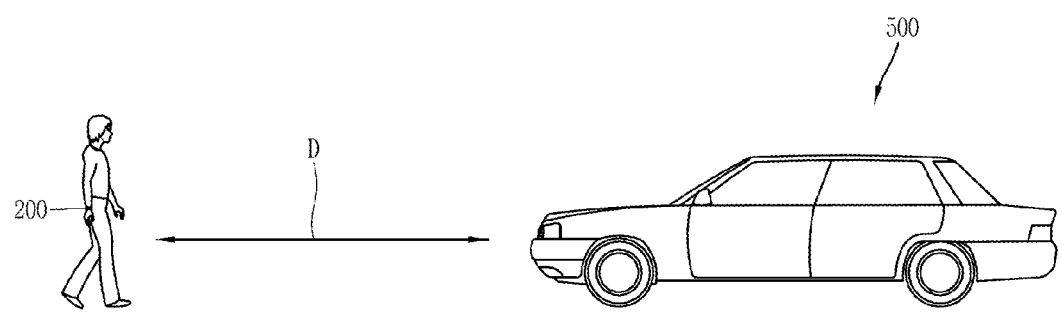
FIG. 10 is a sketch illustrating an example of a relation between a mobile terminal and a vehicle.

As illustrated in FIG. 10, when the user who wears the mobile terminal 100 applies a force to a hand while moving close to the vehicle 500, the mobile terminal 100 may sense a movement of a muscle and transmit a door open control command to the vehicle 50 according to the sensed result so as to open the door.

However, if the door of the vehicle 500 is open at a farther distance than a threshold distance D (hereinafter, referred to as "threshold distance"), in some implementations, the system may determine not to open a trunk or a door of the vehicle, even though the user is detected as carrying a load. This may be done for various reasons, for example, because the user is too far away to be considered likely to be approaching the vehicle, or because it may take too much time for the user to reach the vehicle. As such, the system may mitigate occurrences of unintended opening of a door or trunk of the vehicle, potentially leaving the vehicle vulnerable. For example, an intruder may be likely to break into the vehicle 500 or things located in the vehicle 500 may be likely to be stolen before the user arrives at the vehicle 500.

In some implementations, the system determines a distance from the user's mobile terminal 100 to the vehicle, and the mobile terminal 100 transmits a control command to the vehicle control device 400, 400', 400' according to the sensing result of the movement of the user's muscle, if a position of the user's mobile terminal 100 is within a threshold distance of the vehicle (e.g., in a range where the user can handle the vehicle 500), based on the vehicle control device 400, 400', 400".

As another example, when the mobile terminal 100 has sensed the user carrying a load outside of the threshold distance from the vehicle, a control command may not be transmitted to the vehicle control device 400, 400', and 400". However, when the mobile terminal 100 approaches the vehicle 500 quickly enough such that the distance between the mobile terminal 100 and the vehicle control device 400, 400', 400" falls below the threshold distance within a preset amount of time after first detecting that the user is carrying a load, a control command may be transmitted to the vehicle control device 400, 400', 400" such that the vehicle 500 can execute an operation of opening a trunk and/or door according to the control command.

As such, the mobile terminal 100 and/or the vehicle control device 400, 400', 400" may determine the distance there between according to the aforementioned methods. However, according to some implementations, the mobile terminal 100 may determine the distance from the vehicle control device 400, 400', 400" by receiving the current position of the mobile terminal 100, which may be recognized using the position information module 115 of the mobile terminal 100, and a current position of the vehicle control device 400, 400', 400" which may be determined by the vehicle control device 400, 400', 400" using a GPS module 407' or the like.

The distance between the mobile terminal 100 and the vehicle control device 400, 400', 400" may also be determined based on other techniques. For example, the distance may be determined based on whether or not communication modules equipped in the mobile terminal 100 and the vehicle control device 400, 400', 400", respectively, can communicate with each other, based on sufficient communication signal strength, or the like. As another example, the system may use one or more beacons to determine the distance between the user's mobile terminal 100 and the vehicle control device 400, 400', 400".

The foregoing description has been given of some implementations in which the mobile terminal 100 senses that a user is carrying a load (e.g., based on the movement and/or contraction of muscle) and transmits the control command to the vehicle control device 400, 400', 400".

Additionally, in some implementations, the system may determine an approaching direction of the user's mobile terminal 100 to the vehicle 500, and the mobile terminal 100 may transmit a corresponding control command to the vehicle control device 400, 400', 400" based on the determined approach direction.

The direction that the mobile terminal 100 approaches the vehicle 500 or the vehicle control device 400, 400', 400" may be determined by a variety of techniques. For example, the approach direction may be calculated in a manner of calculating a change vector between a position of the mobile terminal 100 and a position of the vehicle control device 400, 400', 400", which are measured with a preset time interval, and applying a direction element of the change vector.

As another example, the approaching direction of the mobile terminal 100 may be calculated, by taking into account a relative position of the mobile terminal 100, which is obtained based on an azimuth angle measured by various sensors (GPS module, MEMS-based sensors, etc.) mounted in the vehicle control device 400, 400', 400", and the position of the vehicle control device 400, 400', 400".

Additionally or alternatively, the approaching direction of the mobile terminal 100 toward the vehicle control device 400, 400', 400" may be calculated by various techniques by using one or more sensors (e.g., cameras or infrared sensors positioned on the vehicle 500 and/or the mobile terminal 100).

In some implementations, even if the user's mobile terminal 100 is within a threshold distance of the vehicle 500, the system may determine that the user is moving away from the vehicle, and may determine not to open a trunk and/or door of the vehicle 500 based on determining that the user is moving away from the vehicle 500.

In some implementations, prior to performing an operation on the vehicle, the system may determine a state of the vehicle and based on the determined state of the vehicle, may determine which operation to perform. For example, if a user is detected as carrying a load and is within a threshold distance of the vehicle 500, the system may further determine that a door and/or trunk of the vehicle 500 is already open. In this case, the system may determine to perform a different operation on the vehicle than if a trunk and/or door was determined to be closed. For example, if the user is determined to be approaching the vehicle, then the system may leave the trunk and/or door open, or if the user is determined to be moving away from the vehicle 500, then the system may close the trunk and/or door.

In some implementations, the system may perform other actions, in addition to operations of opening/closing a trunk and/or door of a vehicle. For example, other operations on the vehicle may be performed, such as automatically unlocking/locking a door, adjusting seat positions, or other operations. In some implementations, other operations unrelated to the vehicle may be performed, such as sending a communication signal to another device (e.g., sending a text message to another mobile device indicating that a user is moving towards or away from a vehicle while carrying a load).

Figure 13:
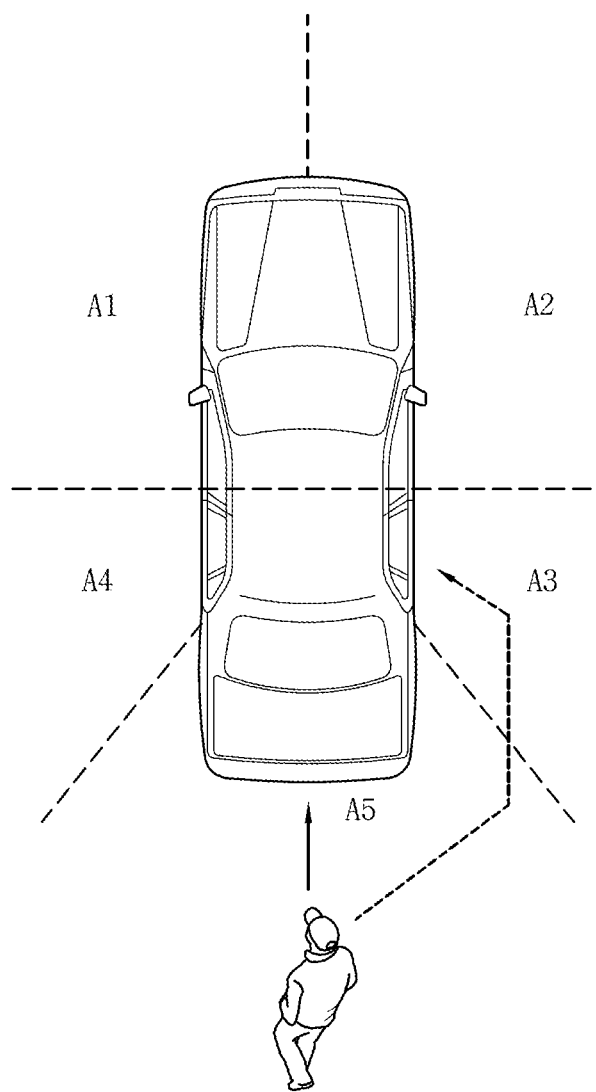
FIG. 13 is a sketch illustrating an example of an area around a vehicle partitioned to locate a mobile terminal.

FIG. 13 is a sketch illustrating an area around a vehicle where a mobile terminal can be located in accordance with some implementations.

For example, in some implementations, the area around the vehicle may be divided into left areas A1, A3, right areas A2, A4 and a rear area A5 based on a center of the vehicle.

In some implementations, the areas divided based on the vehicle 500 may be obtained by considering positions of the doors installed in the vehicle 500 and the trunk. In some implementations, the areas may also be modified or changed according to user setting.

For example, when a user wearing the mobile terminal 100 approaches the vehicle 500 from the rear area A5 of the vehicle 500, the mobile terminal 100 may transmit a control command, which instructs the vehicle control device 400, 400', 400" to open the trunk of the vehicle 500 based on the rearward approaching direction.

In some implementations, when the mobile terminal 100 approaches the vehicle 500 from the areas A1 to A4 of the vehicle 500, the mobile terminal 100 may transmit a control command to the vehicle control device 400, 400', 400", which instructs to open doors corresponding to each area (for example, a driver side door, a passenger side door, a door of a driver-side rear seat, or a door of a passenger-side rear seat, respectively).

In some implementations, the output unit 150 of the mobile terminal 100 may output the approaching direction by use of the display unit 151, the audio output module 153, and the haptic module 155 or a combination thereof.

For example, the example view illustrated in FIG. 13 may be output to a screen through the display unit 151, a different sound may be output according to an approaching direction, or a different tactile effect that the user can feel may be output according to the approaching direction.

In some implementations, the user may set a specific approaching direction toward the vehicle 500 in the mobile terminal 100 in advance.

In a case where an approaching direction of the mobile terminal 100 with respect to the vehicle control devices 400, 400', 400" is different from an approaching direction set by a user, a guiding direction may be output to one of the display unit 151, the audio output unit 153 and the haptic module 155, or a combination thereof, so that the approaching direction of the mobile terminal 100 can be guided to the preset approaching direction.

As an example, consider a scenario in which a user has set the mobile terminal 100 to approach the vehicle 500 via a region A4.

As shown in FIG. 13, in a case where the mobile terminal 100 approaches the vehicle 500 from a rear region A5, the mobile terminal 100 may output a 'P' path guiding to A4 from A5, to one of the display unit 151, the audio output unit 153 and the haptic module 155, or a combination thereof, so that the mobile terminal can approach the vehicle 500 from a direction of A4.

In case of outputting a path inducing the mobile terminal 100 to a preset approaching direction from a current approaching direction, the path may output to the output unit 150 in the form of a turn by turn (TBT).

The mobile terminal according to some implementations may transmit a corresponding control command to the vehicle control devices 400, 400', and 400", based on an approaching direction of the mobile terminal 100 to the vehicle 500. However, in a case where the control command has been preset to the mobile terminal 100 out of range of a threshold distance, based on positions of the vehicle control devices 400, 400', 400", the control command may be transmitted to the vehicle control devices 400, 400', 400", according to a distance between the mobile terminal 100 and the vehicle control devices 400, 400', 400", regardless of an approaching direction of the mobile terminal 100.

In some implementations, mobile terminal 100 may automatically set an approaching direction to the vehicle 500, according to a control command set outside of the threshold distance.

If an approaching direction of the mobile terminal 100 to the vehicle 500 is different from a preset approaching direction, a guiding direction may be output to the output unit 150 in a visual manner, an audible manner, a vibration manner, etc., so that the mobile terminal 100 can be guided to the preset approaching direction.

For instance, if a user carrying baggage with both hands wishes to load the baggage to a seat behind a passenger seat, from a position distant from the vehicle 500, the user may set a command to open a door of the rear seat, at a position out of a threshold distance from the vehicle 500.

If a user wearing the mobile terminal 100 approaches to the vehicle 500 via A5, in a state where the mobile terminal 100 has been automatically set to approach the vehicle via A4, the mobile terminal 100 may output a guiding signal to the output unit 150. In some implementations, the guiding signal is based on a 'P' path so that the mobile terminal 100 can approach the vehicle 500 via A4.

Even if the mobile terminal 100 is positioned within a threshold distance based on the vehicle control devices 400, 400', 400", the vehicle 500 can open the seat behind the passenger seat according to a control command by the vehicle control devices 400, 400', 400", according to a control command, regardless of an approaching direction.

In some implementations, the controller 180 may perform a confirmation procedure on whether to transmit a control command to the vehicle control devices 400, 400', 400", by recognizing a user's voice received through the microphone 122.

Figure 12:
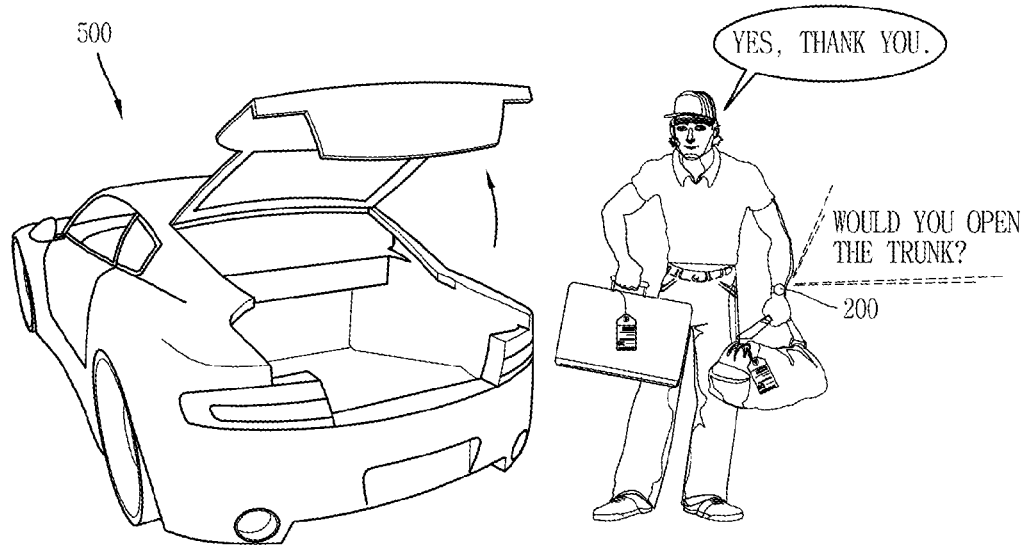

FIG. 12 is a sketch of an example of performing a confirmation procedure.

If the mobile terminal 100 detects that a user is carrying a load (e.g., moves a wrist muscle), then the mobile terminal 100 may transmit a corresponding control command (e.g., a command to open a trunk) to the vehicle control device, so that the vehicle can open a trunk (e.g., FIG. 11).

The mobile terminal 100 may sense a movement of the muscle using a muscle sensor (e.g., muscle sensor 145*b* in FIG. 1B) or a proximity sensor (e.g., proximity sensor 141 in FIG. 1A), and may transmit a control command to the vehicle control devices 400, 400', 400". However, in some implementations, before transmitting the control command to the vehicle control devices 400, 400', 400", the mobile terminal 100 may perform a confirmation procedure.

For example, after detecting that a user is carrying a load, the mobile terminal 100 may transmit a confirmation message to the user so that the user can confirm a control command set by the user through the audio output unit 153, the haptic module 155, etc., set by an approaching direction, or set by a distance. For instance, as shown in the example of FIG. 12, upon detection of the user carrying a load, the mobile terminal 100 may output a confirmation message "Would you like to open the trunk?", through the audio output unit 153.

The controller 180 may recognize the user's voice response received through the microphone 122, and may transmit the control command to the vehicle control devices 400, 400', 400", so that the vehicle 500 can operate according to the control command. For instance, as shown in FIG. 12, the mobile terminal 100 may receive a user's voice response such as "Yes" and/or "Thank you" indicating an affirmative response, through the microphone 122. Then the mobile terminal 100 may transmit a control command to perform an operation on the vehicle (e.g., to open a trunk), to the vehicle control devices 400, 400', 400".

In some implementations, before transmitting the control command to the vehicle control devices 400, 400', 400", the mobile terminal 100 may perform at least one authentication procedure with the vehicle control devices 400, 400', 400".

More specifically, when communication between the mobile terminal 100 and the vehicle control devices 400, 400', 400" is established (when the mobile terminal 100 and the vehicle control devices 400, 400', 400" are directly connected to each other, or when the mobile terminal 100 and the vehicle control devices 400, 400', 400" are connected to each other via at least one network), a first authentication procedure may be performed. If the first authentication procedure is successful, communication connection is established so that the mobile terminal 100 and the vehicle control devices 400, 400', 400" can transceive (transmit and receive) data there between.

The controller 180 may receive authentication information from a user through the user input unit 130, and may perform a second authentication procedure based on the received authentication information.

As examples, the authentication information may be a preset password, a user's fingerprint, information on recognition of a preset pattern, information on a user's iris recognition, or information on a user's specific gesture.

In such implementations, an authorized user can control the vehicle 500 using the mobile terminal 500. This can help prevent a third party wearing the mobile terminal 100 from accessing the vehicle 500.

In some implementations, the controller 180 may perform a third authentication procedure, for example, by recognizing a user's voice received through the microphone 122.

More specifically, the controller 180 may perform a third authentication procedure through biometrics. For example, the controller 180 may use a pitch, a volume, a tone, etc. of a user's own voice. As a specific example, the controller 180 may determine whether authentication has been successfully performed or not, by comparing the pitch, the volume, the tone, etc. of the user's received voice, with those of an authorized user pre-stored in the memory 160.

The third authentication procedure may be additionally performed, so that arbitrary control of the vehicle 500 by an unauthenticated user can be prevented. In some implementations, the mobile terminal 100 performs the third authentication procedure using a voice received through the microphone 122, during a confirmation procedure on whether to transmit a control command to the vehicle control devices 400, 400', and 400".

The mobile terminal according to some implementations may transmit a control command with respect to a plurality of vehicles simultaneously or sequentially, so that the plurality of vehicles having received the control command can operate according to the control command.

Upon detection of a movement of the muscle, the mobile terminal 100 may transmit a control command to the plurality of vehicle control devices 400, 400', and 400".

The mobile terminal 100 may select at least vehicle control device to which a control command is to be transmitted, among the registered vehicle control devices 400, 400', and 400". For such selection, the mobile terminal 100 may include the user input unit 130.

Vehicle Control Device Interworked with Mobile Terminal for Controlling Vehicle by Sensing Movement of User's Muscle Hereinafter, a vehicle control device, interworked with a mobile terminal according to some implementations, includes a communication unit configured to perform communication with the mobile terminal 100 worn on a user's wrist, and a controller 410 configured to control a vehicle through a vehicle drive unit 420 according to a control command received from the mobile terminal 100.

As aforementioned, the mobile terminal 100 is configured to sense a movement of a user's muscle, and to transmit a control command to the vehicle control devices 400, 400', and 400". Details on the mobile terminal 100 have been already given, and thus they will be omitted.

As aforementioned, the vehicle control devices 400, 400', 400" are basically configured to control a vehicle through the vehicle drive unit 420, according to a control command received from the mobile terminal 100. In addition, the vehicle control devices 400, 400', 400" may perform an audio function, a navigation function, etc. In this case, details on components of the vehicle control devices 400, 400', and 400" have been given, and thus they will be omitted.

Vehicle to which Some Implementations are Applicable

Hereinafter, a vehicle, to which the vehicle control device of some implementations is applicable, will be explained with reference to FIG. 14.

Figure 14:
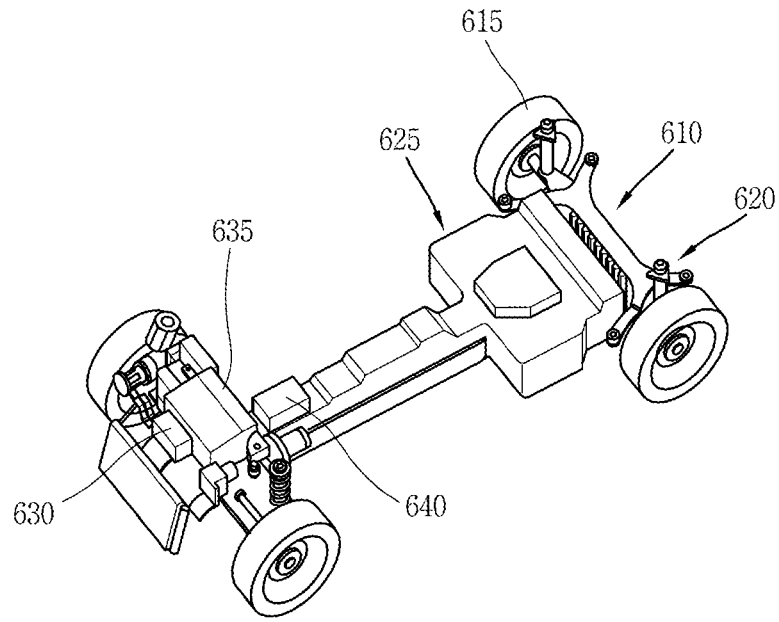
FIG. 14 is a schematic diagram illustrating an example of an electric vehicle provided with a battery charger.

FIG. 14 illustrates an example of an electric vehicle. Other types of vehicles may be used (e.g., vehicles provided with a gasoline engine, a diesel engine, or an LPG engine), as implementations are not limited to a particular type of vehicle.

FIG. 14 is a view illustrating an example of a schematic construction of an electric vehicle having a battery charging device according to some implementations.

As shown in FIG. 14, the electric vehicle 600 having a battery charging device according to some implementations may include a vehicle body 610; a battery 625 provided at the vehicle body 610; and a battery charging device 640 provided at the vehicle body 610, connected to an external power, and configured to charge the battery 625.

Although not shown, a boarding space for a driver or a passenger may be provided at an upper region of the vehicle body 610. For instance, the vehicle body 610 may be provided with a cabin having a boarding space therein.

The vehicle body 610 may be provided with a plurality of wheels 615. A suspension device 620 may be provided between the vehicle body 610 and the wheel 615. Under such configuration, the effects of vibrations and impacts on the vehicle body 610 while running on a road may be attenuated.

The wheel 615 may be provided at each of front, rear, and lateral sides of the vehicle body 610.

The battery 625 for supplying power may be provided at the vehicle body 610.

The battery 625 may be configured as a secondary battery for charging.

An electronic motor 630 for providing a driving force to the wheel 615 may be provided at one side of the vehicle body 610.

An inverter 635 for providing a driving power to the electric motor 630 may be provided at the vehicle body 610. The inverter 635 may be connected to the battery 625 and the electric motor 630, respectively.

The inverter 635 may be connected to the battery 125 to receive a direct current (DC) power, and may convert the DC power to a power suitable for driving of the electric motor 630. Then the inverter 635 may provide the converted power to the electric motor 630.

The battery charging device 640 for charging the battery 625 may be provided at the vehicle body 610. The battery charging device 640 may be provided with a charging circuit 660 connected to an external commercial power (AC), the charging circuit 660 configured to provide the commercial power to the battery 625 after converting the commercial power to a power suitable for charging of the battery 625. Although not shown, the charging circuit 660 may include a commercial power input unit connected to a commercial power and configured to input the commercial power; a rectifying unit and a smoothing unit configured to convert a commercial power input through the commercial power input unit, to a direct current; and a power conversion unit configured to convert a converted direct current into a power suitable for charging of the battery 625, and to output the converted power.

Method of Controlling a Mobile Terminal

Figure 15:
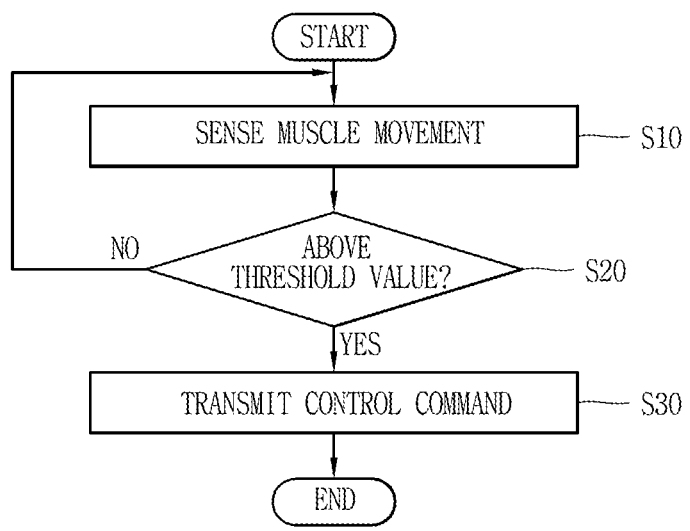
FIGS. 15 to 19 are flow charts illustrating examples of control methods of a mobile terminal.

FIG. 15 is a block diagram illustrating an example of a method of controlling a mobile terminal using a muscle sensor to detect that a user is carrying a heavy load.

As shown in the example of FIG. 15, a method of controlling a mobile terminal according to some implementations includes: sensing a movement of a user's wrist muscle, by a muscle sensor 145*b* (S10); determining whether a value corresponding to the movement of the muscle satisfies a threshold value (e.g., is equal to or greater than a threshold value), by the controller 180 (S20); and transmitting a control command to the vehicle control devices 400, 400', 400" installed at the vehicle 500, by the wireless communication unit 110 (S30).

In S10, the controller 180 may sense whether the muscle has been contracted or relaxed, using one of a force sensing resistor (FSR) sensor, a force sensor and a strain gauge sensor, or a combination thereof. In addition, a movement of the hand may be estimated by sensing a contracted or relaxed state of the muscle, or by measuring an extension/contraction degree of the surface.

In some implementations, the muscle sensor 145*b* is installed at one part of a band of a smart watch worn by the user.

Upon sensing of a movement of the muscle by the muscle sensor 145*b*, the controller 180 may determine whether a value measured by the muscle sensor 145*b* satisfies a threshold value. If the value satisfies the threshold value, the controller 180 may transmit a control command to the vehicle control devices 400, 400', 400" through the wireless communication unit 110 (S30), so that the vehicle 500 can operate according to the control command.

For instance, as shown in FIG. 11 or 12, if a user merely moves his or her wrist muscle, the mobile terminal 100 may sense the movement of the muscle. Then the mobile terminal 100 may transmit a control command corresponding to the detected movement (i.e., command to open a trunk of the vehicle), to the vehicle control devices, so that the vehicle can open a trunk. As such, the system may detect that the user is carrying a load and automatically open a trunk and/or door of the vehicle, even in a difficult situation where a user carries baggage using two hands, a case where baggage has a large volume, a case where the vehicle is parked on a slippery surface, a case where a user has worn uncomfortable shoes, etc.

As aforementioned, the control command transmitted to the vehicle control devices 400, 400', 400" by the mobile terminal 100 may be a control command with respect to all aspects of the vehicle, including a vehicle air-conditioning control command, a vehicle starting on/off command, etc. However, in some implementations, the control command is a control command to open at least one door or window. Here, the door includes not only doors installed to correspond to seats, but also a trunk.

In some implementations, the controller 180 may estimate a finger shape or a wrist shape based on a value measured by the muscle sensor 145*b*. Then the controller 180 may transmit a corresponding control command to the vehicle control devices 400, 400', 400", according to the estimated finger shape or wrist shape.

That is, as shown in FIGS. 9(*a*), (*b*) and (*c*), the controller 180 may estimate a user's finger shape using the muscle sensor 145*b*, and may transmit a different control command to the vehicle control devices 400, 400', and 400" according to the estimated finger shape.

Figure 16:
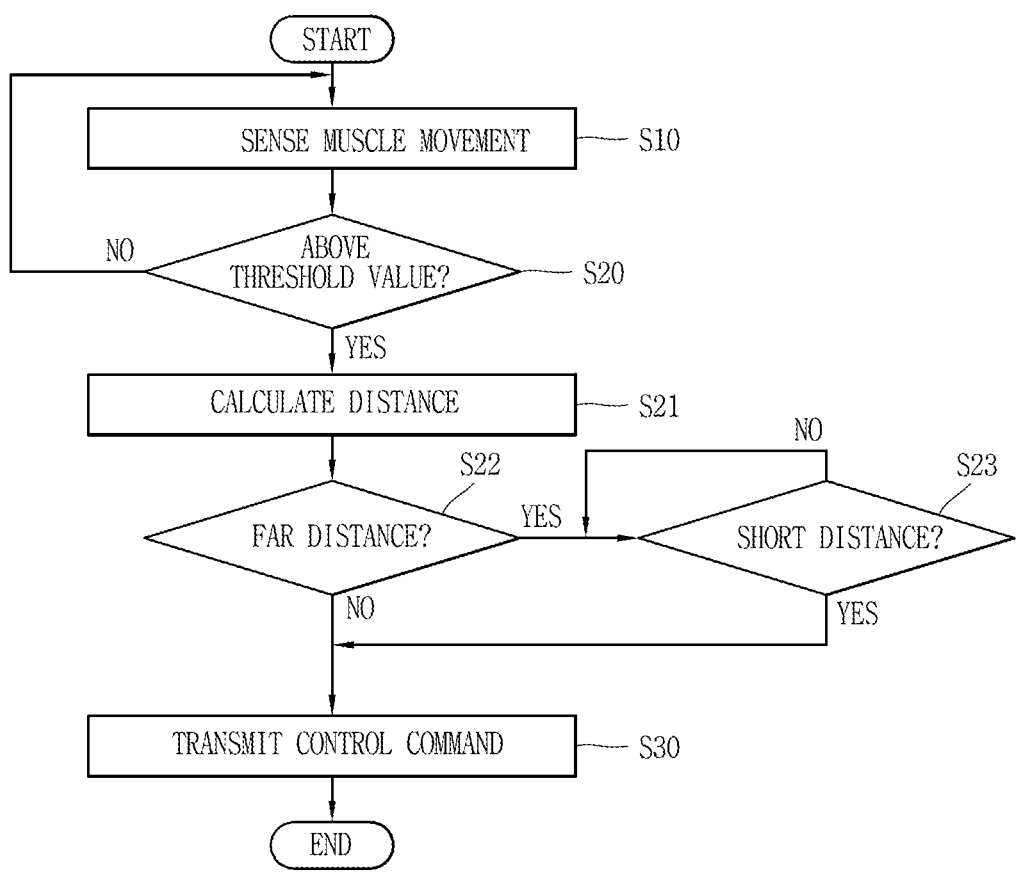

FIG. 16 is a flow chart illustrating a method for controlling a mobile terminal using both a muscle sensor and a proximity sensor to detect that a user is carrying a heavy load.

As illustrated in FIG. 16, the controller 180 may perform the operations indicated in FIG. 15 and may further include an operation (S24) of determining whether muscles move according to a distance to a front object measured through the proximity sensor 141.

As illustrated in FIG. 7, the wrist part of the body has a pronator quandratus M positioned in a front portion, and thus, for example, the proximity sensor is installed in a portion of the band 230 so that the proximity sensor is positioned on a front portion of the wrist, when the mobile terminal 100 is worn on the wrist of the user.

When the user does not apply force to his or her hand, as illustrated in FIG. 8(*a*), the front portion of the wrist part is spaced apart from the band 230 at a predetermined gap, while when the user applies force to the hand, as illustrated in FIG. 8(*b*), the pronator quandratus M contracts and the front portion of the wrist part comes in contact with the band 230 or a space between the front portion and the band becomes narrower, relative to the case in which the user does not apply force to the hand.

The proximity sensor 141 is positioned in the front portion of the write part of the user to sense an object in front of the proximity sensor 141. In this case, the proximity sensor 141 may sense whether muscles move according to a space between the proximity sensor 141 and the wrist part, a front object.

When the space between the proximity sensor 141 and the front object measured by the proximity sensor 141 is smaller than a pre-set value, the controller 180 may determine that force is applied to the user hand, and transmit a corresponding control command to the vehicle control device 400, 400', or 400".

In some implementations, a threshold space used as a reference for the controller 180 to determine whether force is applied to the user hand may be set by the user in advance or may be set through learning.

For example, based on a plurality of distances between the proximity sensor 141 and a front object measured by the proximity sensor 141, the controller 180 may calculate and set a threshold space appropriate for the user through repeated learning using a perceptron algorithm, or the like, used in neural network research.

In some implementations, the controller 180 finally determines whether muscles move using both the sensing results through the muscle sensor 145b and a movement of muscle sensed by the proximity sensor 141, whereby accuracy of determining whether the user applies force may be enhanced.

Also, in order to sense whether the muscles of the user move, the mobile terminal 100 may repeatedly measure the muscle sensor 145b and/or the proximity sensor 141 continuously or at predetermined intervals.

Also, in order to sense whether the muscles of the user move, measurement by the muscle sensor 145b and/or the proximity sensor 141 may be performed when predetermined conditions are met. For example, when a value measured by an accelerometer provided in the mobile terminal 100 is equal to or smaller than a predetermined value, namely, when a change in a location of the body of the mobile terminal 100 is small, whether the muscles of the user move may be sensed using the muscle sensor 145b and/or the proximity sensor 141.

Figure 17:
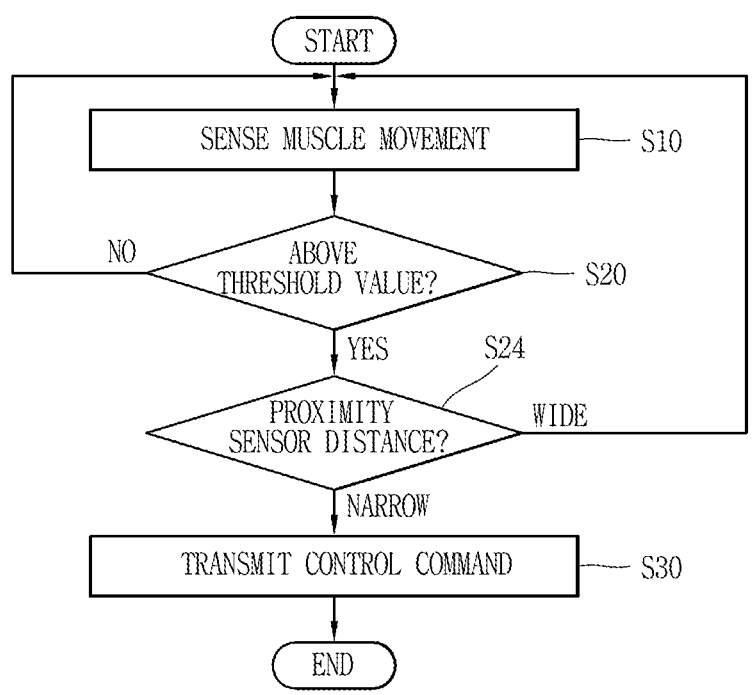

FIG. 17 is a flow chart illustrating an example of a method for controlling a mobile terminal based on distance to a vehicle.

As illustrated in the example of FIG. 17, the method may include the operations of FIG. 15, and may further include an operation (S21) of calculating a distance to the vehicle control device 400, 400', or 400", and whether a vehicle 500 is operated by the vehicle control devices 400, 400', or 400" according to a control command may be determined according to a distance between the mobile terminal 100 and the vehicle control device 400, 400', or 400".

According to some implementations, the controller 180 may transmit a control command determined according to the calculated distance to the vehicle control device 400, 400', or 400".

As illustrated in FIG. 10, when the user that wears the mobile terminal 100 applies force to his or her hand while approaching the vehicle 500, the mobile terminal 100 may sense a movement of muscles and transmit a door open control command to the vehicle 500 to open the door.

However, when the door of the vehicle 500 is open from a position farther than the threshold distance D, someone may break in the vehicle 500 and/or things inside the vehicle 500 may be stolen, before the user reaches the vehicle 500.

Thus, the method may further include a step (S22) of determining whether a control command is generated at a far distance based on the threshold distance D with respect to the vehicle control device 400, 400', or 400".

In some implementations, when the control command is generated at a short distance based on the threshold distance D, the generated control command may be transmitted to the vehicle control device 400, 400', or 400" (S30) to control the vehicle by the vehicle driving unit 420. However, when the control command is generated at a far distance, for example, a step (S23) of determining whether the distance between the vehicle control device 400, 400', or 400" and the mobile terminal 100 is within a short range based on the threshold distance D is further included.

Thus, when the distance between the mobile terminal 100 and the vehicle control device 400, 400', or 400" is within the threshold distance D, the vehicle 500 may be operated by the control command.

If the distance between the mobile terminal 100 and the vehicle control device 400, 400', or 400" is not within the threshold distance D, whether the distance between the mobile terminal and the vehicle control device 400, 400', or 400" is within a short range is determined continuously or repeatedly at pre-set periods, and when the distance between the mobile terminal 100 and the vehicle control device 400, 400', or 400" is within a short range, the control command may be transmitted to the vehicle control device 400, 400', or 400" to control the vehicle by the vehicle driving unit 420.

The step (S21) of calculating a distance between the mobile terminal 100 and the vehicle control device 400, 400', or 400" may be performed by various techniques, as describe previously. For example, the determination of distance may include recognizing a location of the mobile terminal 100 using the location information module 115 of the mobile terminal 100 and a step of calculating a distance between the mobile terminal 100 and the vehicle control device 400, 400', or 400" based on a location of the vehicle control device 400, 400', or 400" received through the wireless communication unit 110 and the location of the mobile terminal 100 calculated using the location information module 115.

Figure 18:
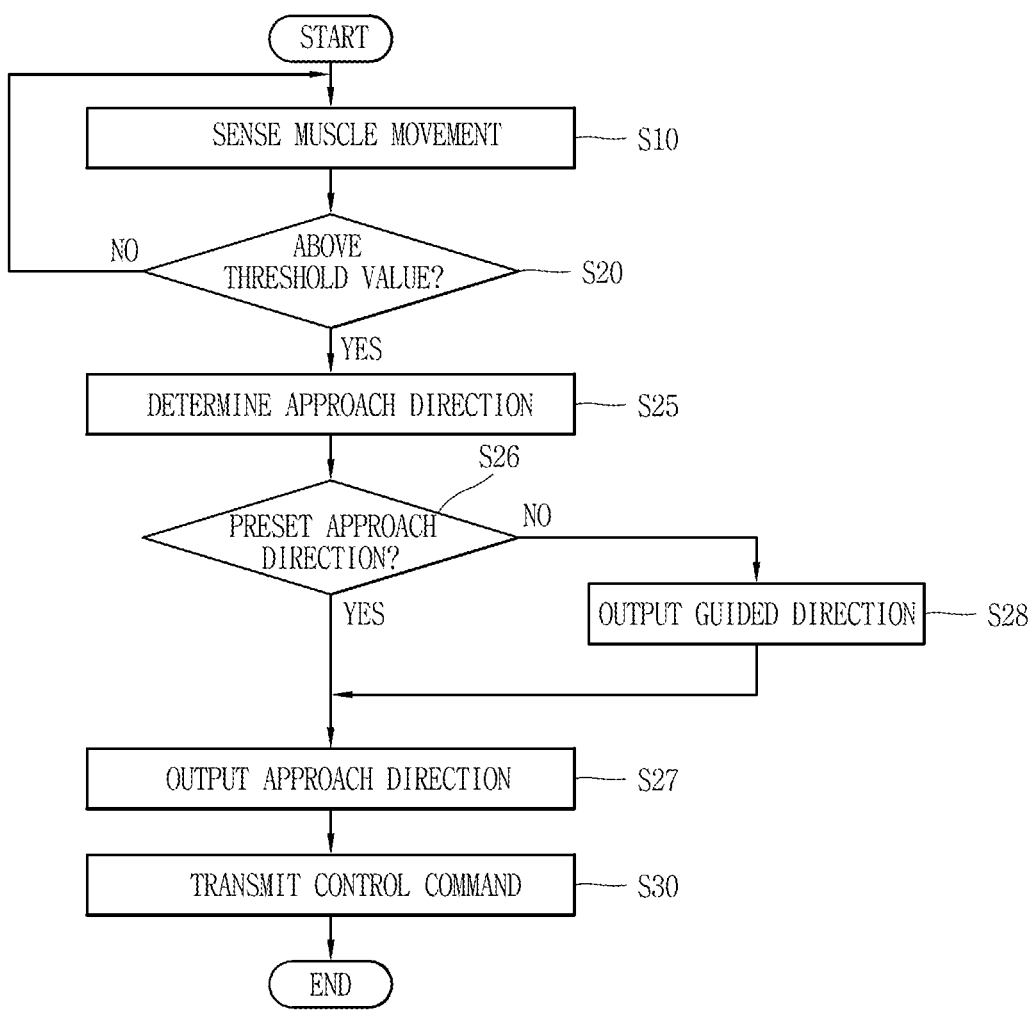

FIG. 18 is a flow chart illustrating an example of a method for controlling a mobile terminal based on an approach direction towards a vehicle.

As illustrated in FIG. 18, the method may include the operations of FIG. 15 and may further include an operation (S25) of determining an approach direction of the mobile terminal 100 with respect to the vehicle control device 400, 400', or 400", and a control command corresponding to the approach direction may be transmitted to the vehicle control device 400, 400', or 400" based on the approach direction.

In detail, in order to determine an approach direction of the mobile terminal 100 with respect to the vehicle control device 400, 400', or 400", a change in a location of the mobile terminal 100 over time may be calculated or an approach direction may be calculated using azimuths measured by various sensors installed in the mobile terminal 100 of the vehicle control device 400, 400', or 400". However, the present disclosure is not limited to a specific method of measuring an approach direction.

For example, as illustrated in FIG. 13, when the user that wears the mobile terminal 100 approaches from a rear area A5 of the vehicle 500, the mobile terminal 100 may transmit a control command for opening a trunk based on the approach direction to the vehicle control device 400, 400', or

400". Thus, the vehicle control device 400, 400', or 400" may drive the vehicle driving unit 420 to open the trunk.

According to some implementations, the method may further include a step (S27) of outputting the approach direction as any one of display, voice, and vibration, or any combination thereof.

The output unit 150 may output the approach direction through any one of the display unit 151, the audio output unit 153, and the haptic module 155, of any combination thereof.

For example, the view illustrated in FIG. 13 may be output to a screen of the display unit 151, a sound or voice may be output according to the approach direction, or a tactile effect allowing the user to have a different tactile impression may be generated through the haptic module 155 according to an approach direction.

In some implementations, the user may specifically set an approach direction in the mobile terminal in advance with respect to the vehicle 500.

In this case, the method may further include a step (S26) of determining whether an approach direction of the mobile terminal 100 with respect to the vehicle control device 400, 400', or 400" is identical to the approach direction set by the user.

When an approach direction of the mobile terminal 100 with respect to the vehicle control device 400, 400', or 400" is different from the approach direction set by the user, a guide direction for guiding (or inducing) the approach direction of the mobile terminal 100 to the pre-set approach direction may be output by any one of the display unit 151, the audio output unit 153, and the haptic module 155, or any combination thereof (S28).

The controller 180 calculates a path from a current location of the mobile terminal to the pre-set approach direction, and outputs the path through the output unit 150, and in this case, the path may be output in a turn-by-turn manner.

Meanwhile, when a control command is set to the mobile terminal from outside of the threshold distance D, the controller 180 may automatically set an approach direction with respect to the vehicle 500 according to a set control command.

Accordingly, when an approach direction of the mobile terminal 100 with respect to the vehicle 500 is different from the pre-set approach direction, a guide direction may be output through display, voice, vibration, or the like, through the output unit 150 in order to guide the approach direction of the mobile terminal toward the pre-set approach direction.

According to some implementations, based on an approach direction of the mobile terminal 100 with respect to the vehicle 500, the mobile terminal 100 may transmit a corresponding control command to the vehicle control device 400, 400', or 400". In this case, however, when the control command is set in the mobile terminal 100 from outside of a threshold distance based on a location of the vehicle control device 400, 400', or 400", a pre-set control command may be transmitted to the vehicle control device 400, 400', or 400" according to a distance between the mobile terminal 100 and the vehicle control device 400, 400', or 400", regardless of an approach direction of the mobile terminal 100, and the vehicle 500 may operate accordingly.

Even if the mobile terminal 100 is located within the threshold distance based on the vehicle control device 400, 400', or 400" through a region A5, the vehicle 500 may open a door of the back seat of the passenger seat side according to a pre-set control command regardless of the approach direction (please refer to FIG. 13).

Figure 19:
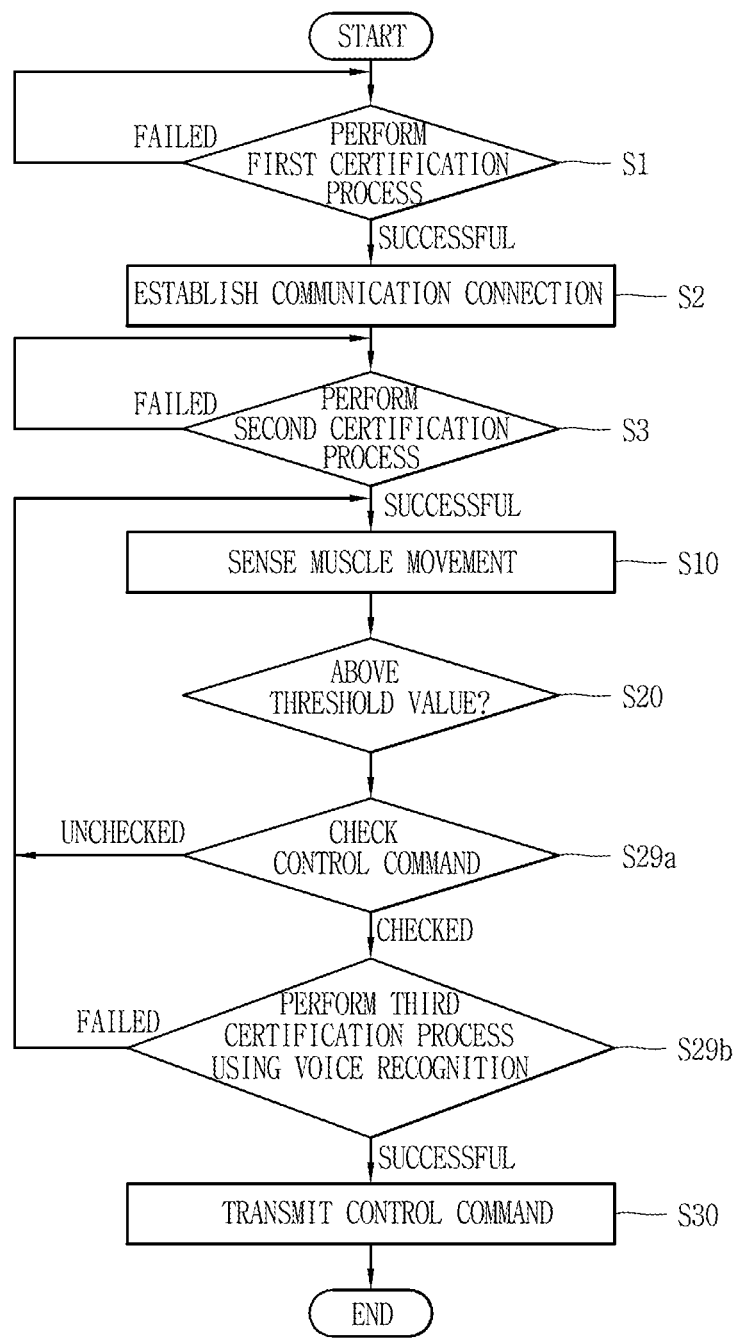

The method for controlling a mobile terminal according to some implementations may further include a step (S29a) of recognizing a user voice received through the microphone 122 and performing a certification process as to whether to transmit a control command (refer to FIG. 19).

When the user moves muscles of the wrist part, the mobile terminal 100 may sense the movement of the muscles of the wrist part and transmit a corresponding control command, namely, a trunk open command, to the vehicle control device 400, 400', or 400" to allow the vehicle to open the trunk (please refer to FIG. 11). In this case, before the control command is transmitted to the vehicle control device 400, 400', or 400", the mobile terminal 100 may perform a certification process.

Namely, when the mobile terminal senses movement of muscles, the mobile terminal 100 may deliver a certification message allowing the user to certify a pre-set control command, a control command determined by an approach direction, or a control command determined according to a distance through the audio output unit 153, the haptic module 155, or the like. For example, as illustrated in FIG. 12, when the mobile terminal 100 senses movement of muscles, a certification message "Would you open the trunk?" through the audio output unit 153.

In response, the controller 180 may recognize a user voice received through the microphone 122 and transmit the control command to the vehicle control device 400, 400', or 400", so that the vehicle 500 may operate according to the control command. For example, as illustrated in FIG. 12, the mobile terminal 100 may receive and recognize "Yes" and/or "Thank you", or the like, of the user voice affirming the certification message through the microphone 122, to thereby transmit a control command for opening the trunk to the vehicle control device 400, 400', or 400".

FIG. 19 is a flow chart illustrating an example of a method for controlling a mobile terminal based on performing a confirmation procedure.

As illustrated in the example of FIG. 19, the method according to some implementations may further include a step of performing at least one authentication process with the vehicle control device 400, 400', or 400" before transmitting the control command to the vehicle control device 400, 400', or 400".

In detail, before establishing communication between the mobile terminal 100 and the vehicle control device 400, 400', or 400" (S2) (including both a case in which the mobile terminal 100 and the vehicle control device 400, 400', or 400" are directly connected for communication and a case in which the mobile terminal 100 and the vehicle control device 400, 400', or 400" are connected for communication through at least one network), the controller 180 may perform a first authentication process, and when the first authentication process is successful, the controller 180 may establish communication connection between the mobile terminal 100 and the vehicle control device 400, 400', or 400" to communicate data.

In some implementations, if the first authentication process fails, communication connection is not established between the mobile terminal 100 and the vehicle control device 400, 400', or 400".

According to some implementations, the method may further include a step (S3) of receiving authentication information from the user through the user input unit 130 and performing a second authentication process based on the input authentication information.

In this case, the authentication information may be information related to a fingerprint of the user, recognition information of a pre-set pattern, user iris recognition information, or information related to a particular gesture of the user.

Accordingly, a user successfully authenticated through the second authentication process may be allowed to control the vehicle 500 using the mobile terminal 100, whereby a third party may be prevented from approaching the vehicle 500 using a stolen mobile terminal 100.

Also, the method may further include a step (S29b) of recognizing a user voice received through the microphone 122 and performing a third authentication process.

In detail, in performing the third authentication process through bio recognition, a pitch of a voice, lungpower, a tone, or the like, specific to users may be used.

Namely, when a user voice received through the microphone 122, the controller 180 may compare the received voice with the pitch, lungpower, tone, or the like, of an authenticated user stored in the memory 160, to determine whether the user is successful with the third authentication process.

In this case, the third authentication process may be separately performed to prevent an unauthorized user from controlling the vehicle 500 without permission. However, in order to solve a problem of cumbersomeness of the additional authentication process, the mobile terminal 100 may perform the third authentication process using a received voice for a certification process with respect to a control command in the step (S29a) of performing the certification process as to whether to transmit a control command to the vehicle control device 400, 400', or 400".

As described above, when the vehicle 500 is controlled through the mobile terminal 100, an authentication process is performed to prevent an unauthorized person from controlling the vehicle through the mobile terminal, thus strengthening security with respect to vehicle control.

Computer-Readable Recording Medium

The method of controlling the mobile terminal according to some implementations may be implemented in a computer-readable medium configured in the form of a program command which is executable through various computer components. The computer-readable recording medium may include a program command, a data file, a data structure, etc. solely or by combination thereof. The program command recorded in the computer-readable recording medium may be particularly designed for some implementations. The computer-readable recording medium includes a hardware device for storing a program command therein, such as an optical recording medium (CD-ROM and DVD), a magneto-optical media (floptical disk), ROM, RAM and a flash memory. The program command includes not only a machine language code formed by a compiler, but also a high-level language code executable by a computer using an interpreter. The hardware device may be configured to operate as one or more software modules for performing the process of some implementations, and vice versa.

A number of methods, techniques, systems, and apparatuses have been described. Nevertheless, various modifications may be made without departing from the scope of this disclosure.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A mobile terminal configured to be worn on a user's wrist region, the mobile terminal comprising:
    a muscle sensor configured to sense movement of muscle in the user's wrist region;
    a proximity sensor configured to sense a proximity of the mobile terminal to the user's wrist region;
    a wireless communication unit configured to perform communication with a vehicle control device provided in a vehicle; and
    a controller configured to:
        determine a distance between the mobile terminal and the vehicle control device;
        determine whether or not to transmit a control command to the vehicle control device based on the distance between the mobile terminal and the vehicle control device; and
        transmit the control command to the vehicle control device based on at least one of a value measured by the muscle sensor or a value measured by the proximity sensor.

2. The mobile terminal of claim 1, wherein the control command is a control command for opening a door, a trunk, or a window of the vehicle.

3. The mobile terminal of claim 1, wherein the controller is configured to:
    determine, at a distance between the vehicle control device and the mobile terminal greater than a threshold distance, that a value measured by the muscle sensor is equal to or greater than a threshold value, and
    transmit, at a distance between the vehicle control device and the mobile terminal smaller than a threshold distance, the control command to the vehicle control device.

4. The mobile terminal of claim 1, further comprising:
    a location information module configured to determine a location of the mobile terminal, wherein the controller is configured to determine the distance between the mobile terminal and the vehicle control device based on a location of the vehicle control device received through the wireless communication unit and the location of the mobile terminal determined by the location information module.

5. The mobile terminal of claim 1, wherein the controller is configured to determine whether or not there is muscle movement based on at least one of a movement detected by the muscle sensor or a distance between the mobile terminal and the wrist region detected by the proximity sensor.

6. The mobile terminal of claim 1, wherein the controller is configured to transmit the control command based on estimating a configuration of a finger or wrist based on a change of muscle movement detected by the muscle sensor.

7. The mobile terminal of claim 1, wherein the controller is configured to transmit a control command corresponding to an approach direction based on a determined approach direction of the mobile terminal with respect to the vehicle control device.

8. The mobile terminal of claim 7, wherein the control command is a control command for opening a door of the vehicle corresponding to the determined approach direction.

9. The mobile terminal of claim 7, wherein the control command is transmitted at a distance between the vehicle control device and the mobile terminal that does not satisfy a threshold distance, and an operation of the vehicle according to the control command is carried out based on determining that a distance between the vehicle control device and the mobile terminal satisfies the threshold distance, regardless of an approach direction of the mobile terminal with respect to the vehicle.

10. The mobile terminal of claim 7, further comprising an output unit configured to output the approach direction using at least one of a display output, an audio output, or a vibration output.

11. The mobile terminal of claim 10, wherein the output unit is configured to, based on the approach direction being determined to be different from a preset approach direction, output a guided direction corresponding to the preset approach direction using at least one of the display output, the audio output, or the vibration output.

12. The mobile terminal of claim 1, further comprising:
an input unit configured to receive an input indicating a selection of at least one vehicle control device, from among a plurality of vehicle control devices, to which to transmit the control command.

13. A control method of a mobile terminal configured to be worn on a user's wrist region, the method comprising:
detecting, using a muscle sensor, movement of muscle in the user's wrist region;
detecting, using a proximity sensor, movement of muscle in the user's wrist region;
determining, using a controller, a distance between the mobile terminal and a vehicle control device in a vehicle;
determining whether or not to transmit a vehicle control command to the vehicle control device based on the distance between the mobile terminal and the vehicle control device, and
transmitting, to the vehicle control device and using the controller that controls a wireless communication unit, the control command based on at least one of a value measured by the muscle sensor or a value measured by the proximity sensor.

14. The method of claim 13, wherein the control command is a control command for opening a door, a trunk, or a window of the vehicle.

15. The method of claim 13, further comprising:
determining, at a distance between the mobile terminal and the vehicle control device greater than a threshold distance, that a value measured by the muscle sensor is equal to or greater than a threshold value, and
transmitting, to the vehicle control device and at a distance between the mobile terminal and the vehicle control device smaller than the threshold distance, the control command.

16. The method of claim 13, wherein determining the distance between the mobile terminal and the vehicle control device comprises:
determining, by a location information module, a location of the mobile terminal; and
calculating a distance between the mobile terminal and the vehicle control device based on a location of the vehicle control device received through the wireless communication unit and the location of the mobile terminal determined by the location information module.

17. The method of claim 13, wherein detecting, using the proximity sensor, movement of muscle in the user's wrist region is based on a distance between the mobile terminal and the user's wrist region measured through the proximity sensor.

18. The method of claim 13, further comprising:
determining an approach direction of the mobile terminal with respect to the vehicle control device,
wherein transmitting the control command to the vehicle control device comprises transmitting a control command corresponding to the determined approach direction.

19. The method of claim 18, further comprising:
outputting, by an output unit, information about the approach direction using at least one of a display output, an audio output, or a vibration output.

20. The method of claim 19, further comprising:
outputting, by the output unit and using at least one of the display output, the audio output, or the vibration output, a guided direction that guides the approach direction to a preset approach direction if the approach direction is different from the preset approach direction.

21. A vehicle control system comprising:
a wearable device comprising a muscle sensor and a proximity sensor that are configured to detect movement of muscle in a user's arm, and a wireless transmission unit configured to transmit a control command to a vehicle control device, based on the detected movement by at least one of the muscle sensor or the proximity sensor; and
a vehicle comprising the vehicle control device that is configured to receive the control command from the wearable device and to control an operation of the vehicle based on a value of movement of muscle in the user's arm that was measured by at least one of the muscle sensor or the proximity sensor,
wherein the wearable device is configured to:
determine a distance between the wearable device and the vehicle control device, and
determine whether or not to transmit the control command to the vehicle control device based on the distance between the wearable device and the vehicle control device.

* * * * *